US012632241B1

(12) United States Patent
Mesde et al.

(10) Patent No.: US 12,632,241 B1
(45) Date of Patent: May 19, 2026

(54) COMPOSITE SOFTWARE BILL OF MATERIALS ANALYSIS

(71) Applicant: Amazon Technologies, Inc., Seattle, WA (US)

(72) Inventors: Roland Mesde, Sunnyvale, CA (US); George Sherif Kamal Hanna, Toronto (CA); Nitin Giri, Bothell, WA (US); Michael Kenneth Dosenbach, Renton, WA (US); Prasad Vyawahare, Redmond, WA (US); Ziad Elmalki, Livermore, CA (US); Sean Crutchlow, San Jose, CA (US); Seungjin Lee, Seattle, WA (US); Paul Mangiamele, Brisbane, CA (US)

(73) Assignee: Amazon Technologies, Inc., Seattle, WA (US)

( * ) Notice: Subject to any disclaimer, the term of this patent is extended or adjusted under 35 U.S.C. 154(b) by 193 days.

(21) Appl. No.: 18/538,949

(22) Filed: Dec. 13, 2023

(51) Int. Cl.
*G06F 9/44* (2018.01)
*G06F 8/65* (2018.01)
*G06F 21/10* (2013.01)
*G06F 21/57* (2013.01)

(52) U.S. Cl.
CPC ............ *G06F 8/65* (2013.01); *G06F 21/1073* (2023.08); *G06F 21/577* (2013.01); *G06F 2221/033* (2013.01)

(58) Field of Classification Search
CPC ........................................................ G06F 8/65
USPC ........................................................ 717/169
See application file for complete search history.

(56) References Cited

U.S. PATENT DOCUMENTS

| | | | |
|---|---|---|---|
| 9,280,653 B2 | 3/2016 | Forest | |
| 9,854,442 B2 | 12/2017 | Mazzara, Jr. | |
| 10,255,065 B1 | 4/2019 | Jensen | |
| 11,973,790 B2 * | 4/2024 | Klein | H04L 63/1433 |
| 12,056,488 B2 | 8/2024 | Closset | |
| 12,075,107 B1 | 8/2024 | Dolan | |
| 12,333,019 B2 | 6/2025 | Duggan | |
| 12,333,020 B2 | 6/2025 | Bussell | |
| 2015/0331974 A1 | 11/2015 | Subbarayan | |

(Continued)

FOREIGN PATENT DOCUMENTS

| | | | | |
|---|---|---|---|---|
| CN | 112100984 A | * | 12/2020 | G06F 40/151 |

OTHER PUBLICATIONS

Sayfan, Gigi, "Matering Kubernetes," May 17, 2017, Packt Publishing Ltd., Birmingham UK, pp. 1-400.

(Continued)

*Primary Examiner* — Evral E Bodden
(74) *Attorney, Agent, or Firm* — Alexander A. Knapp; Kowert, Hood, Munyon, Rankin & Goetzel, P.C.

(57) ABSTRACT

A software bill of materials management and analysis service generates a data structure for analytical operations using a composite software bill of materials (composite SBOM) and performs one or more analytical operations. The composite SBOM may be generated using a plurality of software bill of materials (SBOMs). The software bill of materials management and analysis service may perform analytical operations including, an impact analysis, a license assessment, and a vulnerability analysis. The software bill of materials management and analysis service maintains traceability records for one or more changes made to the composite SBOM and allows audit of changes for the composite SBOM.

20 Claims, 21 Drawing Sheets

(56) References Cited

U.S. PATENT DOCUMENTS

| | | |
|---|---|---|
| 2016/0099806 A1 | 4/2016 | Racklyeft et al. |
| 2016/0132327 A1 | 5/2016 | Tehrani |
| 2016/0330032 A1 | 11/2016 | Naim et al. |
| 2017/0322776 A1 | 11/2017 | Griessmann |
| 2019/0171669 A1 | 6/2019 | Patankar |
| 2019/0317756 A1 | 10/2019 | Bough |
| 2020/0089487 A1 | 3/2020 | Ramic et al. |
| 2020/0201620 A1 | 6/2020 | Beard |
| 2021/0302941 A1 | 9/2021 | Francis et al. |
| 2023/0208880 A1 | 6/2023 | Schutt |
| 2023/0315439 A1 | 10/2023 | Castrejon, III |
| 2023/0359744 A1* | 11/2023 | Duggan ................... G06F 8/65 |
| 2024/0031394 A1 | 1/2024 | Parla |
| 2024/0126530 A1 | 4/2024 | Kairall |
| 2024/0211249 A1 | 6/2024 | Hacker |
| 2024/0264817 A1 | 8/2024 | Kairall |
| 2024/0289745 A1 | 8/2024 | Larkin |
| 2024/0314139 A1 | 9/2024 | Kairall |
| 2024/0320342 A1 | 9/2024 | Blume |
| 2025/0013753 A1 | 1/2025 | Conway |
| 2025/0030719 A1* | 1/2025 | Das ..................... H04L 63/1433 |
| 2025/0181349 A1 | 6/2025 | Xiao |
| 2025/0190575 A1* | 6/2025 | Kirat ..................... G06F 21/577 |
| 2025/0190586 A1* | 6/2025 | Torisaki ................ G06F 21/577 |

OTHER PUBLICATIONS

Lili Zhang et al., "A DRM System Based on PKI", 2010 Fourth International Conference on Genetic and Evolutionary Computing, IEEE, 2010, pp. 522-525.

Mattias Ohrn, "Publice Key Infrastructure Utilisation in Digital Rights Management", KTH Numerical Analysis and Computer Science, 2004, pp. 1-84.

U.S. Appl. No. 16/581,571, filed Sep. 24, 2019, Michael Christopher Wenneman et al.

U.S. Appl. No. 17/014,742, filed Aug. 31, 2021, David Joseph Mifsud, et al.

U.S. Appl. No. 18/538,942, filed Dec. 13, 2023, Roland Mesde, et al.

U.S. Appl. No. 16/453,921, filed Jun. 26, 2019, Marco Argenti.

U.S. Appl. No. 16/385,070, filed Mar. 30, 2020, Brett Francis.

U.S. Appl. No. 17/219,711, filed Mar. 31, 2021, Rodriguez, et al.

U.S. Appl. No. 17/548,216, filed Dec. 10, 2021, Davis et al.

U.S. Appl. No. 17/809,878, filed Jun. 29, 2022, Roland Mesde, et al.

U.S. Appl. No. 18/194,391, filed Mar. 31, 2023, Alex Bessonov, et al.

U.S. Appl. No. 17/037,376, filed Sep. 29, 2020, Michael Garcia, et al.

* cited by examiner

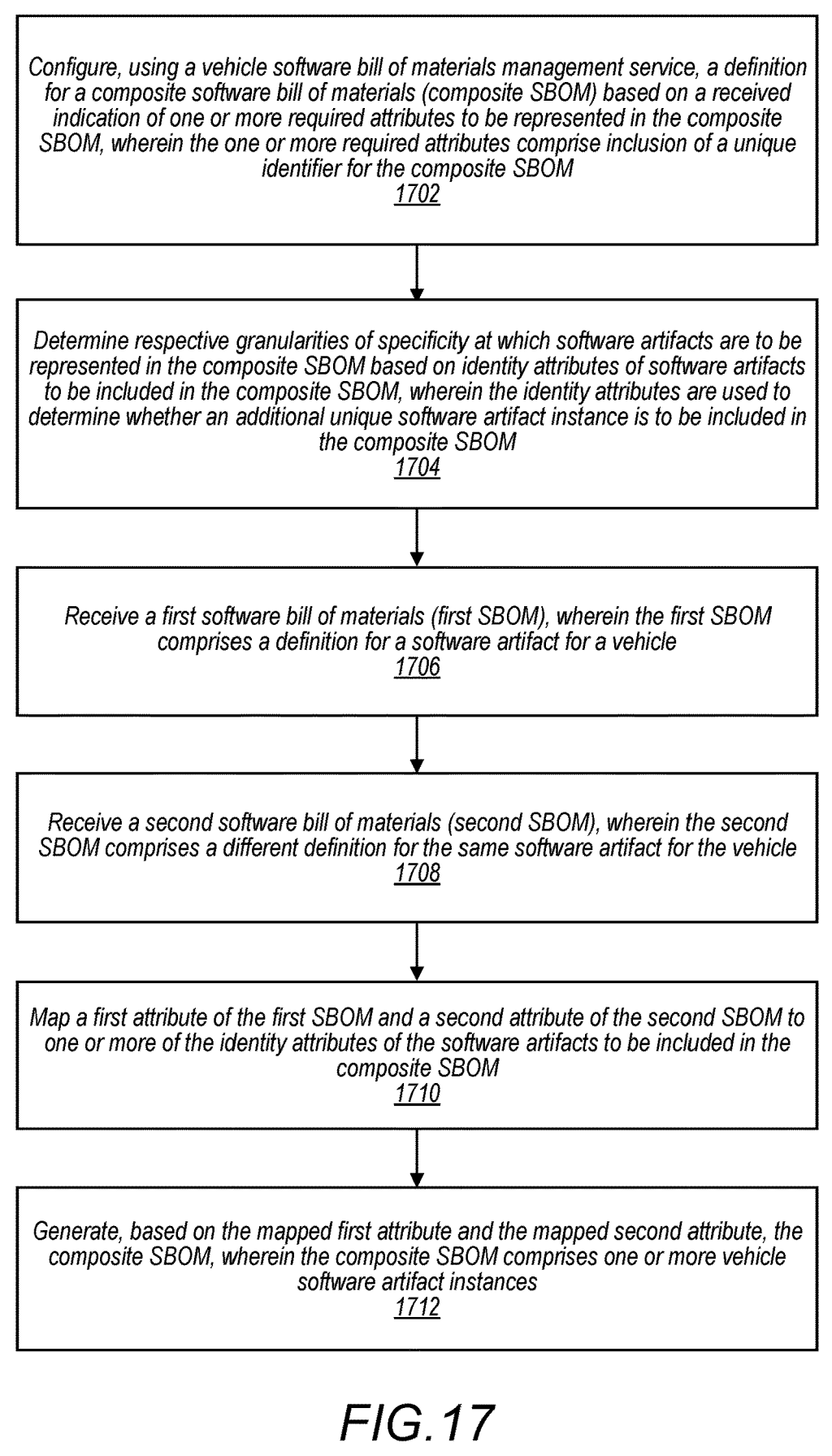

Configure, using a vehicle software bill of materials management service, a definition for a composite software bill of materials (composite SBOM) based on a received indication of one or more required attributes to be represented in the composite SBOM, wherein the one or more required attributes comprise inclusion of a unique identifier for the composite SBOM
1702

Determine respective granularities of specificity at which software artifacts are to be represented in the composite SBOM based on identity attributes of software artifacts to be included in the composite SBOM, wherein the identity attributes are used to determine whether an additional unique software artifact instance is to be included in the composite SBOM
1704

Receive a first software bill of materials (first SBOM), wherein the first SBOM comprises a definition for a software artifact for a vehicle
1706

Receive a second software bill of materials (second SBOM), wherein the second SBOM comprises a different definition for the same software artifact for the vehicle
1708

Map a first attribute of the first SBOM and a second attribute of the second SBOM to one or more of the identity attributes of the software artifacts to be included in the composite SBOM
1710

Generate, based on the mapped first attribute and the mapped second attribute, the composite SBOM, wherein the composite SBOM comprises one or more vehicle software artifact instances
1712

FIG.17

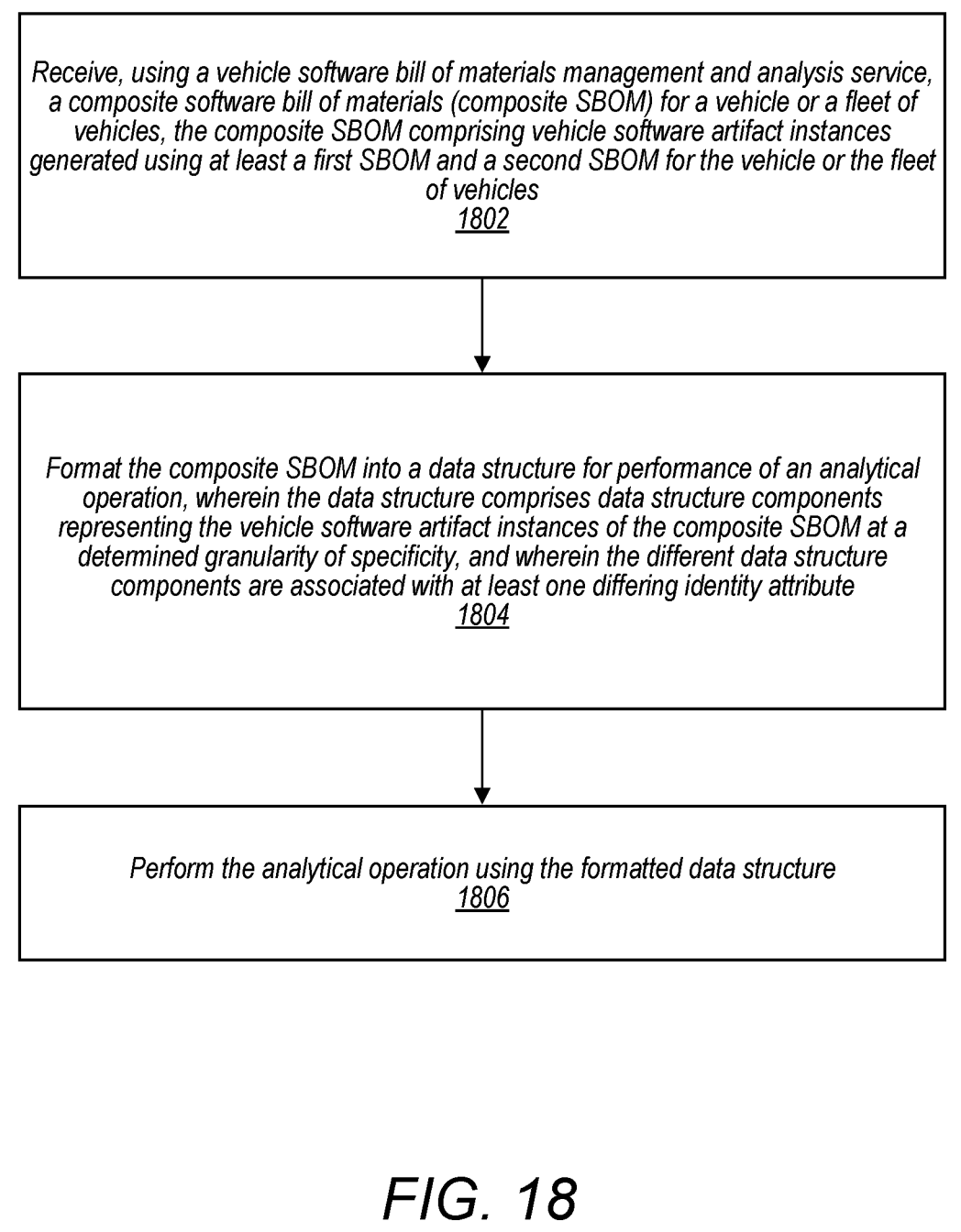

Receive, using a vehicle software bill of materials management and analysis service, a composite software bill of materials (composite SBOM) for a vehicle or a fleet of vehicles, the composite SBOM comprising vehicle software artifact instances generated using at least a first SBOM and a second SBOM for the vehicle or the fleet of vehicles
1802

Format the composite SBOM into a data structure for performance of an analytical operation, wherein the data structure comprises data structure components representing the vehicle software artifact instances of the composite SBOM at a determined granularity of specificity, and wherein the different data structure components are associated with at least one differing identity attribute
1804

Perform the analytical operation using the formatted data structure
1806

FIG. 18

COMPOSITE SOFTWARE BILL OF MATERIALS ANALYSIS

BACKGROUND

Modern vehicles, such as cars, trucks, motorcycles, etc. are often manufactured with electronic sensors and include computer systems (e.g., electronic control units (ECUs)) programmed with control algorithms (e.g., software) that take inputs from such electronic sensors to determine various control actions to be taken for the vehicle or systems implemented in the vehicle. Vehicles often include multiple ECUs. For example, different ECUs included in a vehicle may have different capabilities or capacities as compared to other ECUs in the vehicle. Moreover, the different ECUs in the vehicle may utilize various interrelated software artifacts. A change made to any of the interrelated vehicle software artifacts, such as an update to a software artifact already implemented on the vehicle, a change in the configuration settings, or other changes to the software artifacts of the vehicle may have a cascading effect.

BRIEF DESCRIPTION OF THE DRAWINGS

FIG. 17 illustrates a flowchart of operations performed by a vehicle software bill of materials management and analysis service to generate a composite SBOM for a vehicle using one or more received SBOMs, according to some embodiments.

FIG. 18 illustrates a flowchart of operations performed by a vehicle software bill of materials management and analysis service to generate a data structure for analytical operation using a composite SBOM, according to some embodiments.

Figure 1A:
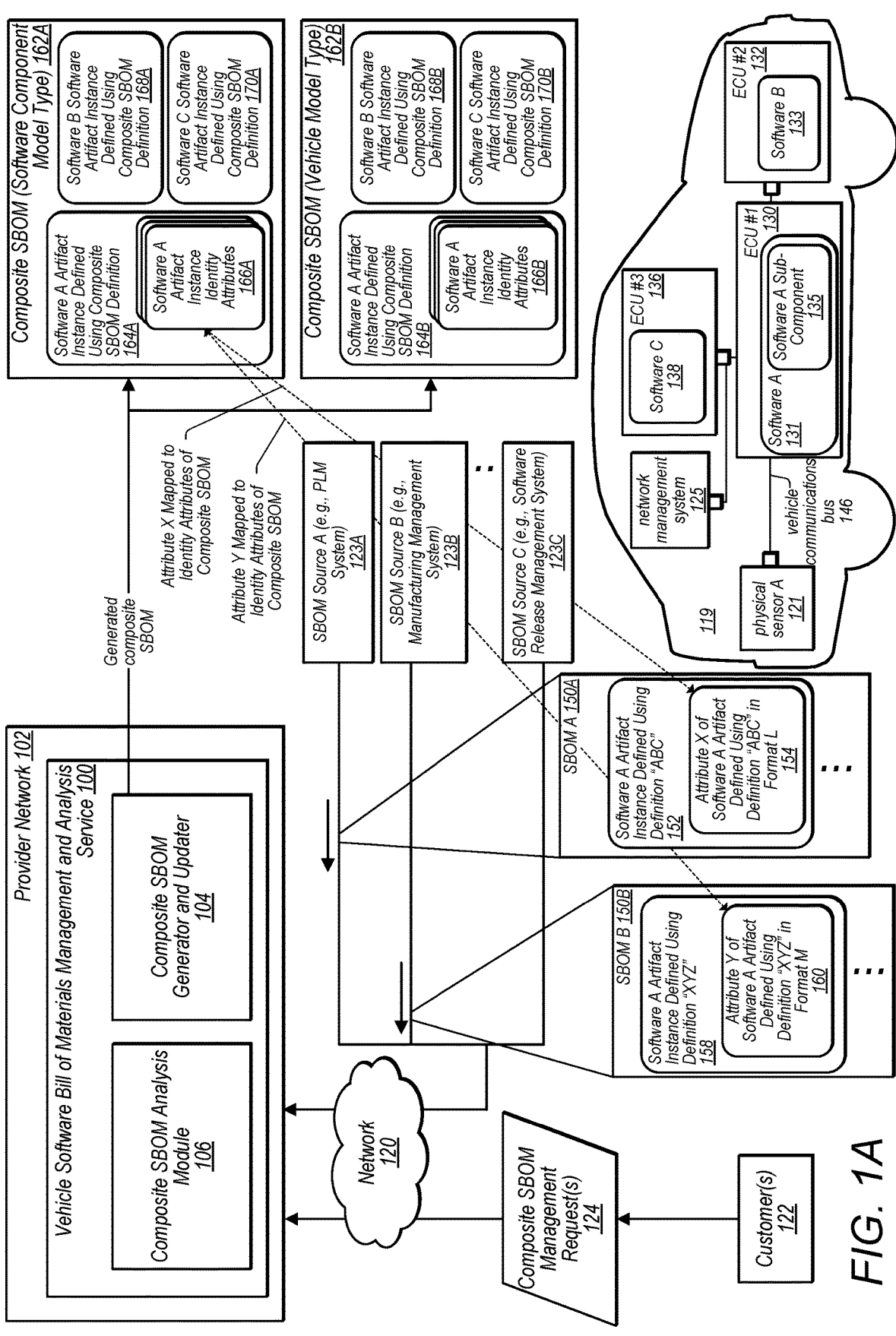
FIG. 1A illustrates a vehicle software bill of materials management and analysis service that generates or updates a composite software bill of materials (composite SBOM) for a vehicle using one or more received software bill of materials (SBOMs), according to some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

DETAILED DESCRIPTION OF EMBODIMENTS

The systems and methods described herein include techniques for implementing a vehicle software bill of materials management and analysis service that generates or updates a composite software bill of materials (composite SBOM) for a vehicle using one or more received software bill of materials (SBOMs). The vehicle software bill of materials management and analysis service may furthermore generate a data structure for performing analytical operations from a composite SBOM, such as a property graph comprising nodes and edges. The vehicle software bill of materials management and analysis service may perform one or more analytical operations using the generated data structure, according to some embodiments.

A software bill of materials (SBOM) may be an inventory that describes software artifacts. The SBOM may describe various attributes of software artifacts for a vehicle. The SBOM (and related technical artifacts associated with the SBOM) may be generated at different stages in the process of automotive software development. At least one difficulty in maintaining multiple SBOMs from multiple sources may be a lack of a single unified view to represent a particular software entity for a vehicle. For example, various vehicle software services, vehicle software developers, or original equipment manufacturers (OEMs) may use different names to refer to a same software artifact for the vehicle. For example, a continuous integration and continuous deployment (CI/CD) service for the vehicle may use a different identifier (e.g., software artifact "XYZ") for a software artifact compared to another identifier (e.g., software artifact "ABC") used by a sensor data enrichment service for the same software artifact. In addition to different identifiers being used for the same vehicle software artifact, different vehicle software services (and vehicle software developers, OEMs, etc.) may associate different attributes for the same vehicle software artifact. For example, the CI/CD service may associate different attributes to a vehicle software artifact compared to the vehicle sensor data enrichment service.

Furthermore, maintaining a single view for a particular vehicle software artifact may be manual and challenging. For example, as mentioned above, different vehicle software developers may use various names for the same software artifact. This inconsistency in naming conventions may pose difficulties in creating a unified view. A standardized naming convention may be required to integrate these disparate names into a single view. Moreover, each entity in a software bill of materials (SBOM) may have multiple metadata associated with it. Certification data, versioning data, and licensing data, may be associated with a single vehicle software artifact. However, different SBOM sources may associate different metadata to software artifact instances of respective SBOMs, making it challenging to consolidate and align the diverse metadata into a cohesive, comprehensive view. Moreover, information about software artifacts may reside in different repositories, databases, or systems. These software artifact data sources may be required to be integrated and processed in order for them to be presented in a unified view. However, manually collating data from these disparate software artifact data sources may be time-consuming and error prone. Moreover, such errors may propagate through the system, leading to discrepancies in the unified view.

In some embodiments, vehicle software bill of materials management and analysis service may integrate, format, and maintain SBOMs from various sources to generate a composite SBOM. For example, the vehicle software bill of materials management and analysis service may address different naming variations and diverse metadata associations to provide a single view of software artifacts instances. The vehicle software bill of materials management and analysis service may allow a user to configure a definition for the composite SBOM by receiving an indication of one or more required attributes to be represented in the composite SBOM. In some embodiments, the software bill of materials management and analysis service may define structures and attributes for software artifact instances, wherein both software and vehicles associated with a software artifact may be defined. Software artifact instances definitions are further discussed in FIG. 2. In some embodiments, the software bill of materials management and analysis service may configure specific processing instructions for received SBOMs, including validation and transformation processing instructions. Received SBOMs may be transformed to supported file formats with pre-configured mappings. Processing of received SBOMs are further discussed in FIG. 3.

In some embodiments, the software bill of materials management and analysis service may generate software artifact instances comprising location information for SBOM used to generate the software artifact instance. The location information may comprise a combination of a unique namespace and an external reference identification ("external ID"), wherein the external ID is an identifier used in a SBOM that the software artifact instance has derived from. The location information of software artifact instances are further discussed in FIGS. 4-5. In some embodiments, the software bill of materials management and analysis service may define conflict resolution rules using a SBOM source registry. The software bill of materials management and analysis service may specify how overlapping or conflicting data from various SBOM sources should be processed. The software bill of materials management and analysis service may establish conflict resolution rules to determine which SBOM data takes precedence when conflicts arise, ensuring consistency and accuracy within the composite SBOM. The processing of conflicting data from various SBOM sources are further discussed in FIG. 6.

In some embodiments, the software bill of materials management and analysis service track changes made in a lifecycle of a software artifact. Because SBOM ingestion may be asynchronous between the various SBOM sources, there may be a need to establish immutability for a software artifact instance at a certain point for audit purposes (typically when the software artifact is released for distribution, or when the software artifact has completed a certification process). Customers may define completeness conditions within the SBOM source registry or trigger an explicit API call to mark a software artifact instance as complete. The indication of completeness for software artifact instances is further discussed in FIG. 7. In some embodiments, the software bill of materials management and analysis service may support attachment of custom metadata (such as binaries). The custom metadata may be code documentation, test results, certification data, or additional binaries. The software bill of materials management and analysis service may allow software artifact instances of the composite SBOMs to include such custom metadata. The attachment of custom metadata is further discussed in FIG. 8.

In some embodiments, the software bill of materials management and analysis service may introduce an audit trail service responsible for recording all changes occurring within each software artifact instance. The audit trail service is further discussed in FIG. 9. In some embodiments, the software bill of materials management and analysis service may comprise a replica service that selectively stores historical replicas of SBOMs received. In some embodiments, the replica service may store a history of merge or split operations used to generate the composite SBOM. The replica service is further discussed in FIG. 10. In some embodiments, the software bill of materials management and analysis service may focus on supporting merge and split operations for potentially immutable software artifact instances that contain anomalies. The software bill of materials management and analysis service may create new software artifact instances and update existing references to point to the newly created software artifact instances to correct the anomalies. The merge and split operations are further discussed in FIGS. 11-12. In some embodiments, the software bill of materials management and analysis service may provide a comprehensive full text search index for efficient search and retrieval software artifacts instances. The full text search index is further discussed in FIG. 13.

In some embodiments, the software bill of materials management and analysis service may apply continuous extract, transform, and load (ETL) processes to format a composite SBOM into a data structure required for analytical operations. The ETL processes are further discussed in FIG. 14. In some embodiments, the vehicle software bill of materials management and analysis service may provide one or more analyses based on the data structure required for analytical operations, wherein the data structure required for analytical operations is based on the composite SBOM. For example, the vehicle software bill of materials management and analysis service may perform impact analysis for vehicle software to be deployed. The vehicle software bill of materials management and analysis service may leverage the single unified view of the data structure to determine the impact of deployment of a software artifact on a software ecosystem of a vehicle.

In some embodiments, the software bill of materials management and analysis service may perform one or more analytical operations such as impact analysis discussed above. In some embodiments, the analytical operations may furthermore include license assessment that evaluates whether software artifacts of a vehicle comply with predefined license constraints. The analytical operations may furthermore include vulnerability analysis that determines potential security vulnerabilities. The different analysis operations are further discussed in FIGS. 15A-15B. In some embodiments, the software bill of materials management and analysis service may comprise a vehicle template exporter that allows customers to export templates used to configure virtual electronic control units (vECUs). The vehicle template exporter is further discussed in FIG. 16.

FIG. 1A illustrates a vehicle software bill of materials management and analysis service that generates or updates a composite software bill of materials (composite SBOM) for a vehicle using one or more received software bill of materials (SBOMs), according to some embodiments.

In some embodiments, a vehicle software bill of materials management and analysis service 100 may be a cloud-based system that is included in a provider network, such as provider network 102. In some embodiments, the provider network 102 may include data centers, networking infrastructure, etc. configured to provide cloud-based services. Also, in some embodiments, the provider network 102 may be set up by an entity such as a company or a public sector organization to provide one or more services (such as various types of cloud-based services) accessible via the Internet and/or other networks. In some embodiments, the cloud-based system may be included in a private provider network that is established within the service provider's data center for private use. The private provider network may be isolated from other users and may provide dedicated connectivity and resources for the service provider's private use, such as in a virtual private cloud. In some embodiments, the cloud-based system may be included in a public provider network that is shared among multiple tenants or organizations within a cloud service provider's data center. The vehicle software bill of materials management and analysis service 100 may be implemented in a public provider network or a private provider network, as well as a virtual private network included in a public provider network. In some embodiments, the vehicle software bill of materials management and analysis service 100 may be partially implemented in both private and public provider networks. The provider network 102 may be implemented in a single location or may be implemented in multiple data centers hosting various resource pools, such as collections of physical and/or virtualized computer servers, storage devices, networking equipment and the like (e.g., provider network 102 may include multiple computing systems 1900 described below with regard to FIG. 19), needed to implement and distribute the infrastructure and services offered by the provider network 102, including the vehicle software bill of materials management and analysis service 100.

In some embodiments, a vehicle software bill of materials management and analysis service 100 may comprise a composite SBOM generator and updater 104 and a composite SBOM analysis module. The composite SBOM generator and updater 104 may allow customers 122 to define attributes associated with software artifacts and vehicle. The composite SBOM generator and updater 104 may update software artifact models and vehicle models based on the customer defined attributes. Furthermore, composite SBOM generator and updater 104 may generate software artifact instances in a composite SBOM based on the software artifact models and vehicle models. For example, a customer 122 may provide customer defined attributes for a software artifact instance. The composite SBOM generator and updater 104 may generate a composite SBOM using the customizable attributes. The customizable attributes may provide flexibility in shaping structure of the vehicle software component model as what constitutes a software artifact. Customers 122 may specify attributes to be linked to a software artifact and tailor the definition to suit their specific needs. The customizable software artifact attributes are further discussed in FIG. 2.

In some embodiments, the vehicle software bill of materials management and analysis service 100 may receive a plurality of SBOMs for one or more vehicles (e.g., vehicle 119) from a plurality of SBOM sources. For example, the vehicle software bill of materials management and analysis service 100 may receive a SBOM A 150A from SBOM source A 123A and a SBOM B 150B from SBOM source B 123B. In some embodiments, the SBOM source A 123A may be a product lifecycle management (PLM) system, wherein the PLM system serves as a comprehensive platform that oversees various stages of software development for a software for use in a vehicle (e.g., the vehicle 119). The SBOM source A 123A may provide the SBOM A 150A to the vehicle software bill of materials management and analysis service 100, wherein the SBOM A 150A is tailored for PLM system functions (such as orchestration creation, evolution, deployment, and phase out of software components). In some embodiments, the SBOM source B 123B may be a manufacturing management system, wherein the manufacturing management system may be a specialized framework that oversees the production, assembly, and quality control processes related to software components for a vehicle (e.g., the vehicle 119). The SBOM source B 123B may send the SBOM B 150B to the vehicle software bill of materials management and analysis service 100, wherein the SBOM B 150B is tailored for manufacturing management system functions (such as version control, configuration management, and automated testing used to maintain consistency across software batches). In some embodiments, the vehicle software bill of materials management and analysis service 100 may receive one or more SBOMs from other SBOM sources, including SBOM source C 123C. The SBOM source C 123C may be a software release management system that oversee the deployment of software updates and releases for a vehicle (e.g., the vehicle 119). The SBOM source C 123C may orchestrate the scheduling and deployment of updates for a vehicle or for a fleet of vehicles. Additional types of SBOM sources are further discussed in FIG. 6.

In some embodiments, the vehicle 119 associated with the SBOM A 150A and the SBOM B 150B may be one of a plurality of different types of vehicles, such as trucks, vans, sedans, and trailers. Also, the vehicle 119 may be a vehicle manufactured by one of various manufacturers. In some embodiments, the vehicle 119 may a vehicle comprising vehicle components manufactured by a same manufacturer or different manufacturers. Although FIG. 1A illustrates one vehicle as being described by SBOMs from the SBOM sources, this illustration is intended only as an example and it should be understood that any number of vehicles may be described by various SBOM sources. In some embodiments, SBOMs from SBOM sources may describe vehicle software and may be associated with various type of vehicles (not specific to a single vehicle). In some embodiments, the SBOMs may be associated with a specific vehicle (or a fleet of vehicles). Moreover, although FIG. 1A illustrates three SBOM sources, this illustration is intended only as an example and it should be understood that any number of SBOM sources may be connected to the vehicle software bill of materials management and analysis service 100 via network 120. In some embodiments, the network 120 may be a private or public network connection to a service provider network hosting the vehicle software bill of materials management and analysis service 100. For example, a public connection may be an Internet connection.

In some embodiments, the customer 122 may send (to the composite SBOM generator and updater 104) a composite SBOM management request 124. The composite SBOM management request 124 may be a request to generate a composite SBOM (software component model type) 162A using SBOM A 150A and SBOM B 150B. In some embodiments, the composite SBOM management request 124 may be a request to update the composite SBOM (software component model type) 162A or generate a new composite SBOM based on future SBOMs received from the SBOM source A 123A and SBOM source B 123B. Based on the composite SBOM management request, the composite SBOM generator and updater 104 may generate the composite SBOM 162A. In some embodiments, the composite SBOM management request 124 may be a request to generate a composite SBOM (vehicle model type) 162B using a plurality of SBOMs. In some embodiments, different SBOMs received by composite SBOM generator and updater 104 may use different definitions (e.g., names) to refer to a same software artifact on the vehicle. For example, the SBOM A 150A from the SBOM source A 123A may comprise a software A artifact instance defined using definition "ABC" 152. However, SBOM B from the SBOM source B 123B may comprise a software A artifact instance defined using definition "XYZ" 158. The differences in definitions for the same software (e.g., software A 131) may need to be resolved in order to generate a composite SBOM (e.g., the composite SBOM 162A (software component model type)). To generate the composite SBOM 162A (software component model type), the composite SBOM generator and updater 104 may map attribute X 154 of software A artifact defined using definition "ABC" in format L to one or more of software A artifact instance identity attributes 166A. Similarly, to generate the composite SBOM 162A (software component model type), the composite SBOM generator and updater 104 may map attribute Y 160 of software A artifact defined using definition "XYZ" in format M to the one or more of software A artifact instance identity attributes 166A. The composite SBOM generator and updater 104 may generate a software A artifact instance defined using composite SBOM definition 164A using the mapped attribute X 154 and mapped attribute Y. In some embodiments, the attribute X 154 and attribute Y 160 may be required to be in a format able to be processed by the composite SBOM generator and updater 104. The composite SBOM generator and updater 104 may format attributes of the software A artifact instance defined using definition "ABC" 152 and attributes of the software A artifact instance defined using definition "XYZ" 158 into specified formats. In some embodiments, SBOMs (not only attributes of the SBOM) may be required to be in a specified format required to generate the composite SBOM 162A (software component model type). The composite SBOM generator and updater 104 may format the SBOMs to specified formats. The formatting of SBOMs and attributes of SBOMs are further discussed in FIGS. 3-6. In some embodiments, the composite SBOM 162A (software component model type) may comprise a software B software artifact instance 168A defined using composite SBOM definition and a software C software artifact instance 170A defined using composite SBOM definition. In some embodiments, the composite SBOM generator and updater 104 may perform similar mapping between instances of software A artifact (of received SBOMs received by) to software A artifact instance identity attributes 166B of software A artifact instance defined using composite SBOM definition 164B to generate the composite SBOM 162B (vehicle model type). Generation and management of the composite SBOM 162A (software component model type) and composite SBOM 162B (vehicle model type) are further discussed in FIGS. 2-12.

In some embodiments, the vehicle 119 may comprise ECU (1) 130, ECU (2) 132, ECU (3) 136, physical sensor A 122, network management system 124, software A 131 of ECU (1) 130, software B 133 of ECU (2) 132, software C 138 of ECU (3) 136, software A subcomponent 135 of ECU (1) 130, and vehicle communications bus 146. In some embodiments, the software A, B, and C 131, 133, and 138

(respectively) may be represented in the composite SBOM 162B (vehicle model type) using the software A artifact instance 164B defined using composite SBOM definition, a software B artifact instance 168B defined using composite SBOM definition, and a software C artifact instance 170B defined using composite SBOM definition. In some embodiments, the composite SBOM generator and updater 104 may determine granularity of specificity at which software artifacts are to be represented in one or more of the composite SBOMs 162A and 162B. For example, based on granularity of specificity determined by the customer 122, the software A subcomponent 135 may be represented in the composite SBOM 162A (software component model type) by the software A artifact instance 164A. In some embodiments, based on a different granularity of specificity, the software A subcomponent 135 may be represented in the one or more of the composite SBOMs 162A and 162B by a separate software A artifact subcomponent instance. The granularity of specificity is further discussed in FIG. 2.

Figure 1B:
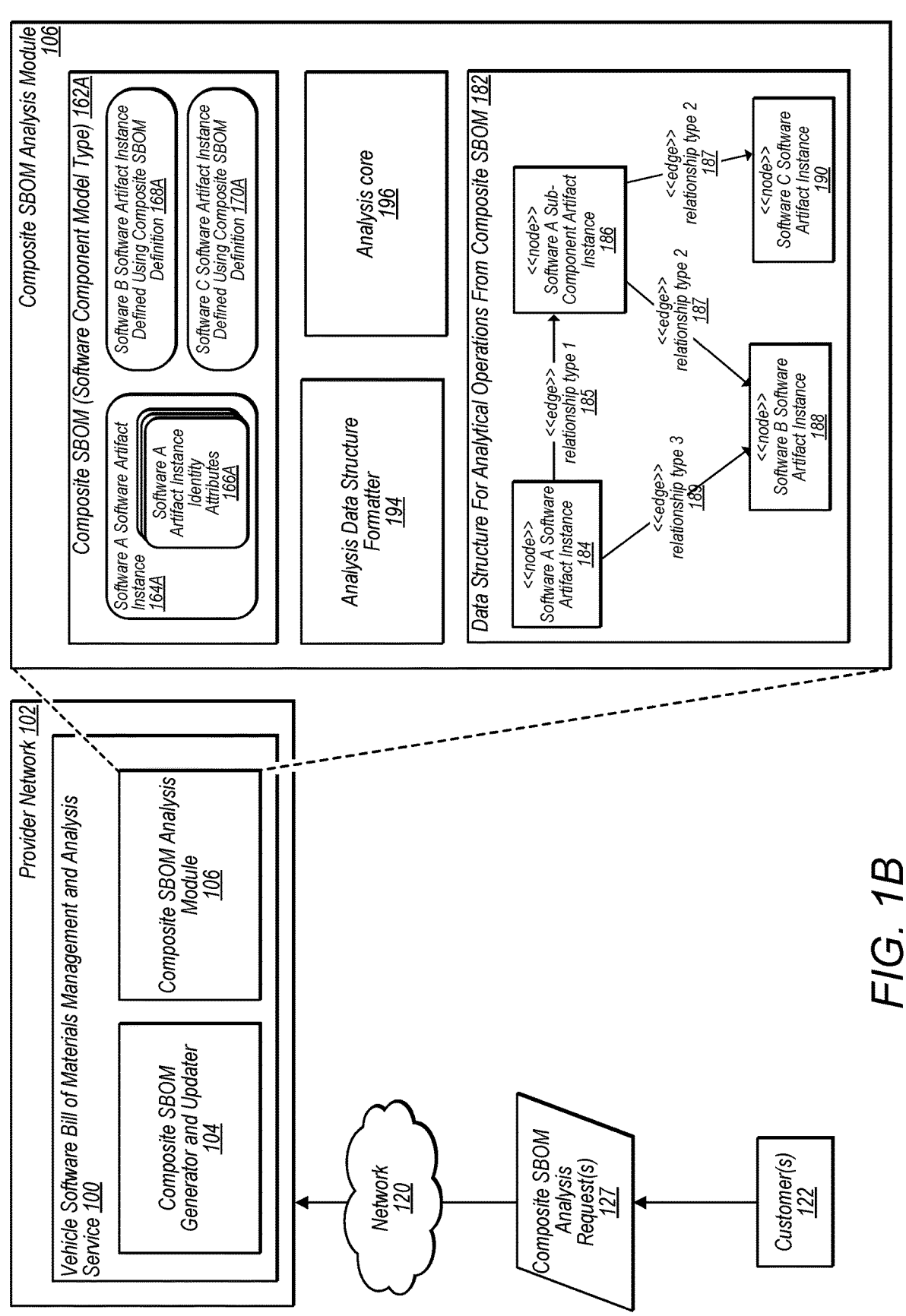
FIG. 1B illustrates a vehicle software bill of materials management and analysis service that generates a data structure for analytical operations using a composite SBOM and performs one or more analytical operations, according to some embodiments.

FIG. 1B illustrates a vehicle software bill of materials management and analysis service that generates a data structure for analytical operations using a composite SBOM and performs one or more analytical operations, according to some embodiments.

In some embodiments, a composite SBOM analysis module 106 may comprise a composite SBOM 162A (software component model type), an analysis data structure formatter 194, an analysis core 196, and a data structure for analytical operations from composite SBOM 182. In some embodiments, the analysis data structure formatter 194 may format the composite SBOM 162A (software component model type) into a data structure for analytical operations from composite SBOM 182. For example, the analysis data structure formatter 194 may systematically arrange the composite SBOM 162A (software component model type) and extract pertinent attributes of software artifact instances (such as software versions, dependencies, component relationships, etc.) and arrange these elements into a property graph. The analysis data structure formatter 194 may format nodes of the property graph to represent distinct software components, each labeled with associated attributes, wherein the nodes are delineated according to a granularity of specificity of a plurality of granularities of specificity included in the composite SBOM 162A (of software component model type). Relationships between these nodes may be represented using edges to represent dependencies, interactions, and hierarchies among various software entities. Attributes such as version numbers, dependencies, and associated metadata (such as test results, certification data, or binaries) may further be used to label the nodes. The data structure for analytical operations from composite SBOM 182 may be used by the analysis core 196 to perform one or more analysis operations.

In some embodiments, in addition to the property graph, the analysis data structure formatter 194 may generate a data structure comprising one or more of: arrays, trees, hash tables, graphs (directed graphs or undirected graphs), or heaps. In some embodiments, the data structure 182 for analytical operations from composite SBOM may comprise a node 184 that represents software A software artifact instance from the composite SBOM 162A (of software component model type), a node 186 that represents software A sub-component software artifact instance, a node 188 that represents software B software artifact instance from the composite SBOM 162A (of software component model type), and a node 190 that represents software C software artifact instance from the composite SBOM 162A (of software component model type). In some embodiments, edge 185 may indicate relationship type 1 that describes an allots type relationship, wherein the first node allocates resources used to implement a subordinate node. For example, the node 184 representing software A software artifact instance may allocate virtual environment for the node 186 representing software A sub-component software artifact instance. In some embodiments, other relationship types may be used in the data structure 182 for analytical operations from composite SBOM. For example, edge 187 of relationship type 2 may be used to describe a relationship wherein the first node provides one or more required parameters to the other. In some embodiments, edge 189 of relationship type 3 may describe production relationship, wherein the first is dependent upon the second artifact instance.

The analysis core 196 may perform one or more analysis operations using the data structure 182 for analytical operations from composite SBOM. For example, the analysis core 196 may traverse the data structure 182 for analytical operations from composite SBOM to perform impact analysis. For example, the analysis core 196 may traverse a property graph generated from the composite SBOM 162A (of software component model type) and evaluate repercussions that a deployment of a software artifact would have on related software artifacts. The analysis core 196 may provide insights on how an alteration in one software artifact may cascade across a suite of software artifacts. The analysis core 196 may perform other analytical operations, including license assessment operations and vulnerability analysis operations. The various analytical operations are further discussed in FIGS. 15A-15B.

Figure 2:
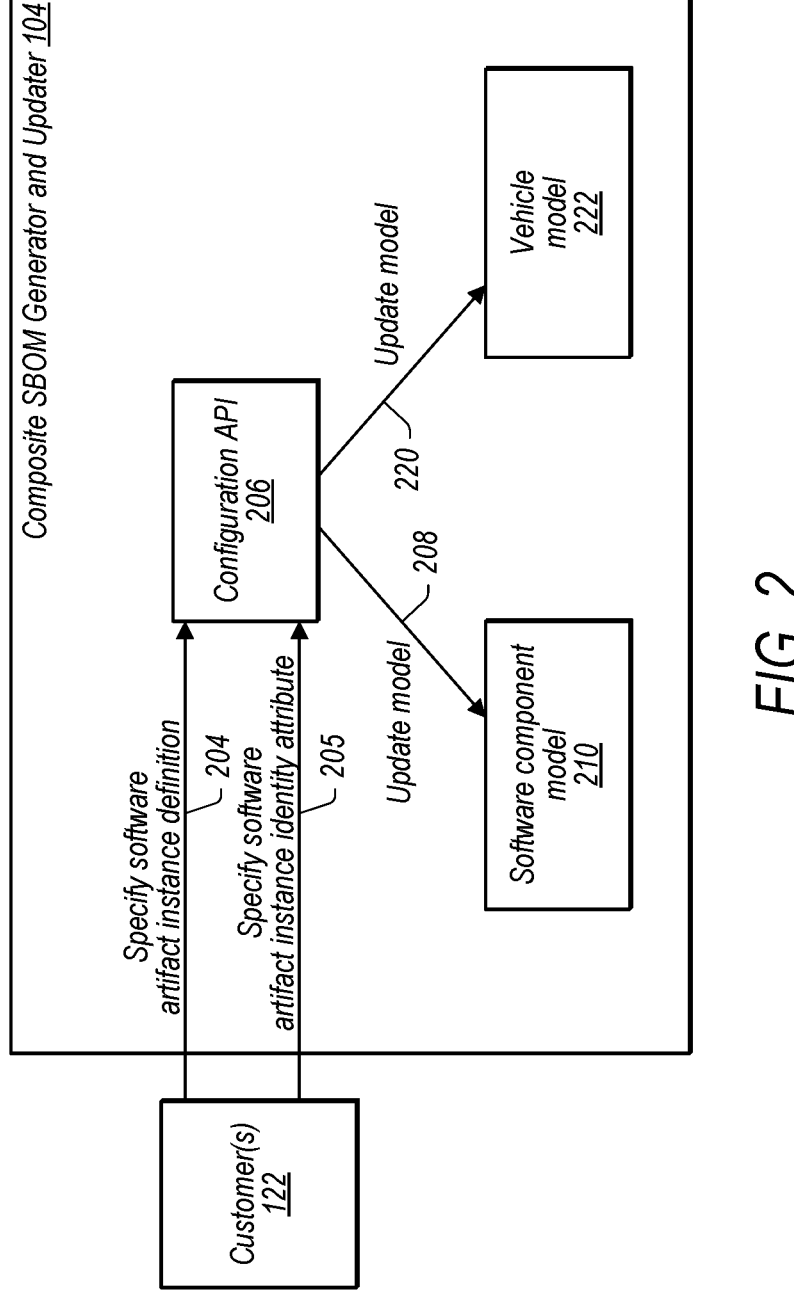
FIG. 2 illustrates a more detailed view of a composite SBOM generator and updater that configures a definition and identity attributes for a software artifact instance of a composite SBOM using a software component model and a vehicle model, according to some embodiments.

FIG. 2 illustrates a more detailed view of a composite SBOM generator and updater that configures a definition and identity attributes for a software artifact instance of a composite SBOM using a software component model and a vehicle model, according to some embodiments.

In some embodiments, a composite SBOM generator and updater 104 may comprise a configuration API 206. A customer 122 may specify 204 using the configuration API 206 software artifact instance definition. The artifact instance definition may define structures and attributes for both a software component model 210 and vehicle model 222. The software component model 210 and vehicle model 222 may be used as templates for generating software artifact instances of a composite SBOM. The software artifact instances of the composite SBOM may be of either a software component model type or a vehicle model type. The software component model type may represent any software entity of a vehicle whereas the vehicle model type may represent software entity associated with a specific vehicle or vehicle system referenced by the software entity. For example, software artifact instances of software component model type for a composite SBOM (of software component model type) may be characterized by low cardinality, wherein the composite SBOM (of software component type) may have a limited number of unique values or connections representing components of a software artifact itself. The software artifact instances of the software component model type may not be limited to a specific vehicle configuration. In some embodiments, software artifact instances of vehicle component type for a composite SBOM (of vehicle component model type) may be characterized by high cardinality. For example, the composite SBOM (of vehicle model type) may have a high number of unique values or connections representing the software artifacts, wherein the software artifacts represented are associated with parts of a specific vehicle (or a fleet of vehicles). The definitions for the software component model 210 and vehicle model 222 may furthermore designate what attributes are to be associated with the software artifact instances. For example, the software artifact instance definition may require that a software artifact instance be associated with a "artifact version" attribute. In some embodiments, the software component model 210 and the vehicle model 222 may require different identity attributes (e.g., fundamental identifiers). In some embodiments, the customer 122 may specify 205 the software artifact instance identity attributes. For example, the customer 122 may specify that for a software component model type software artifact instance, the software component model 210 requires an artifact name, a version number, and an external reference identification ("external ID"), wherein the external ID is an identifier used in a SBOM that the software artifact instance has derived from. In some embodiments, the customer 122 may specify for a vehicle model type software artifact instance, the vehicle model 222 to require a vehicle identification (vehicle ID) for a specific vehicle (or fleet of vehicles). The customer 122 may provide custom definition for the software component model 210 and vehicle model 222 for various software and vehicle entities described in a SBOM. In some embodiments, the composite SBOM generator and updater 104 may allow customer 122 to configure granularity using the unique identifier of a vehicle software artifact. For example, based on the definition for software artifact instance specified by the customer 122, the composite SBOM generator and updater 104 may represent a subcomponent of software artifact A as a separate software artifact instance from a software artifact instance for software artifact A.

Figure 3:
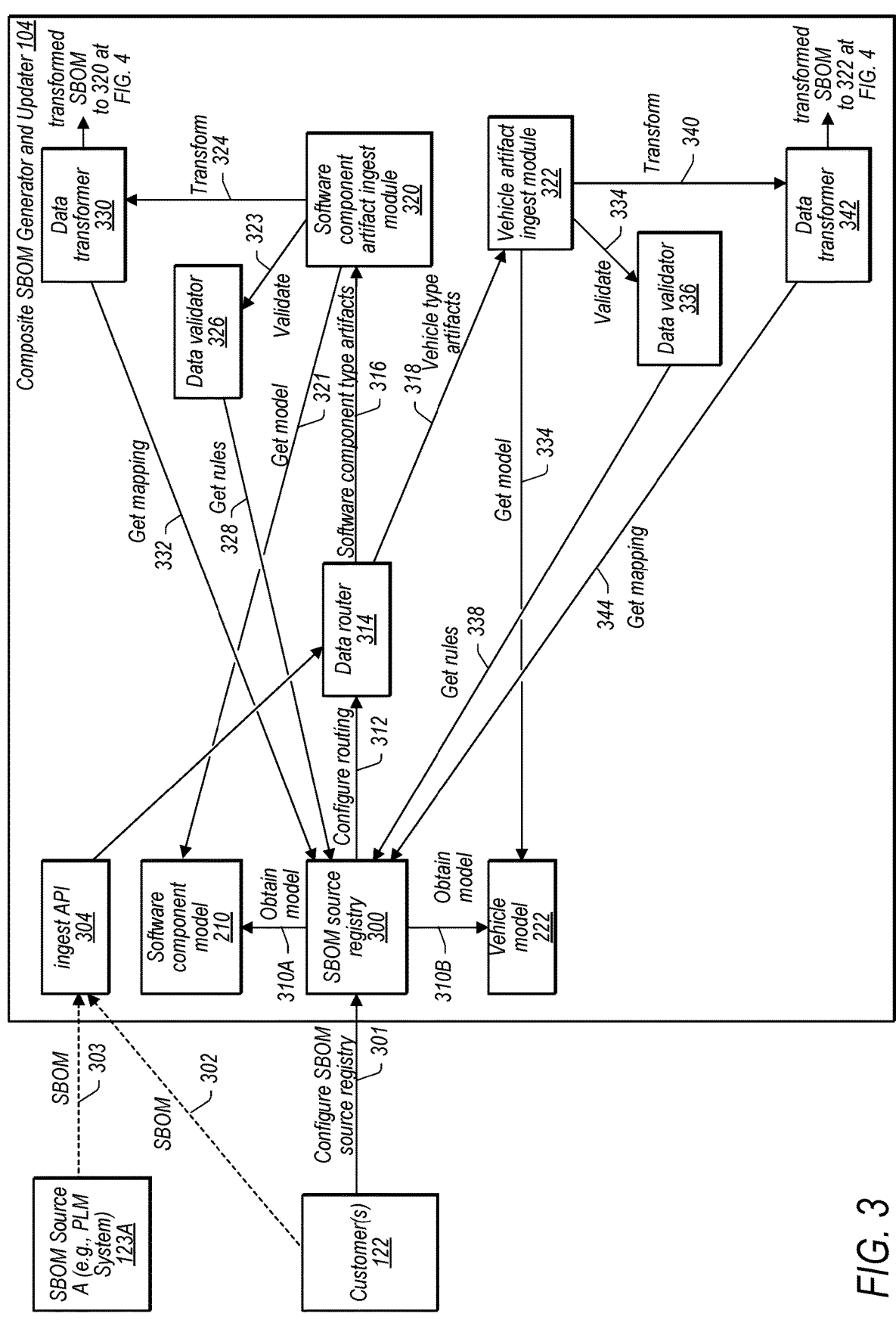
FIG. 3 illustrates a more detailed view of a composite SBOM generator and updater that transforms one or more SBOMs received using mapping rules, wherein the mapping rules describe mappings between attributes of the one or more received SBOM and an attribute of a composite SBOM, according to some embodiments.

FIG. 3 illustrates a more detailed view of a composite SBOM generator and updater that transforms one or more SBOMs received using mapping rules, wherein the mapping rules describe mappings between attributes of the one or more received SBOM and an attribute of a composite SBOM, according to some embodiments.

In some embodiments, the composite SBOM generator and updater 104 may comprise a SBOM source registry 300, a software component model 210, a vehicle model 222, an ingest API 304, a data router 314, data validators 326 and 336, data transformers 330 and 342, a software component artifact ingest module 320, and a vehicle artifact ingest module 322. In some embodiments, the composite SBOM generator and updater 104 may configure 301 a SBOM source registry with identity attributes (such as name, version, architecture, etc.) for software artifact instances, and rules for reconciling the varied identifiers.

For example, a SBOM source A 123A may send SBOM 303 (and a customer 122 may send SBOM 302) to the composite SBOM generator and updater 104 using the ingest API 304. In some embodiments, the customer may configure 301 SBOM source registry and configure 312 routing of received SBOMs using the data router 314. The data router 314 may route portions of the received SBOMs associated with software component type artifacts 316 to the software component artifact ingest module 320. The software component artifact ingest module 320 may obtain model 321 from the software component model 210 to determine structure and required attributes of a software artifact instance to be generated from the ingested SBOM. In some embodiments, the customer 122 may configure specific identity attributes as discussed in FIG. 2. For instance, one customer may have selected only "name" as the identity attribute, while another customer may have selected a combination of "name", "version", and "platform" as identity attributes. Based on the identity attributes configured to be solely the "name", the composite SBOM generator and updater 104 may generate a software artifact instance for a composite SBOM whenever the composite SBOM generator and updater 104 ingests SBOM data with a different name. However, based on the identity attributes configured to be a combination of "name", "version", and "platform", the composite SBOM generator and updater 104 may create new entities for each unique combination. The composite SBOM generator and updater 104 may generate new software artifact instances based on any differences in the "version" and "platform" in addition to the "name". The data router 314 may route portions of the received SBOMs associated with vehicle type artifacts 318 to the vehicle artifact ingest module 322. The vehicle artifact ingest module 322 may obtain model 334 from the vehicle model 210 to determine required structure and required attributes of a software artifact instance to be generated from the ingested SBOM. In some embodiments, the data router 314 may determine that a portion of the received SBOMs is to be routed to one, or both, of the software component artifact ingest module 320 and vehicle artifact ingest module 322. For example, a portion of a SBOM received may describe an software artifact for a specific vehicle (and therefore be routed to the vehicle artifact ingest module 322), and the same portion of the SBOM may also be used to update the architecture of the software artifact itself (and therefore be routed to the software component artifact ingest module 320).

In some embodiments, the composite SBOM generator and updater 104 may perform set of validation processes that are needed be done to ingest data identified as a software component model type software artifact instance. For example, data validators 326 and 336 may get rules 328 and 338 from the SBOM source registry 300 to perform a series of validation checks to ensure the accuracy, integrity, and compliance of the ingested SBOM data with a defined standards and requirements. In some embodiments, the validation processes may include verification of data formats, verification of completeness, validation of the data against predefined rules or schemas. As another example, the data validator may obtain rules requiring that the SBOM data ingested should be in a specific format (e.g., JSON format). Given rules requiring that the SBOM data be in JSON format, the data validators 326 and 336 may fail the validation on receiving data in CSV. In some embodiments, the vehicle software bill of materials management and analysis service may perform transformation processes to convert ingested data into a software artifact model or a vehicle model. For example, the vehicle software bill of materials management and analysis service may alter data structure of the ingested data or format the data into a schema. In some embodiments, composite SBOM generator and updater 104 may transform 324 and 340 the ingested SBOM data into a software artifact instance of a composite SBOM in a software component model type or a vehicle model type. In some embodiments, the transformation process may comprise one or more of: data format transformation and attribute mapping. The data transformer 330 may transform ingested SBOM data to have correct SBOM format as well as map the attribute of the software artifact instance of the ingested SBOM to attribute of a software artifact instance of the composite SBOM. For example, based on receiving data in JSON, the data transformer 330 may transform the ingested SBOM data by mapping metadata within that artifact received to the correct items that are defined according to the software component model 210. The data transformer 330 may provide the transformed SBOM to software component artifact ingest module 320 for storage and additional location information labeling, as further discussed in FIG. 4. Similarly, the data transformer 342 may transform the ingested SBOM data by mapping metadata within that artifact received to the correct items that are defined according to the vehicle model 222. The data transformer 342 may provide the transformed SBOM to the software component artifact ingest module 322 for storage and additional location information labeling, as further discussed in FIG. 4.

In some embodiments, the received SBOMs may be formatted into a supported file format. For example, a file format of a received SBOM may be one of a Cyclone Dependency Exchange (CycloneDX) file format, a Software Package Data Exchange (SPDX) file format, a Comma-Separated Values (CSV) file format, an extensible Markup Language (XML) file format, or a JavaScript Object Notation (JSON) file format. The file format of the received SBOM may be transformed to conform to a required file format of a composite SBOM.

Figure 4:
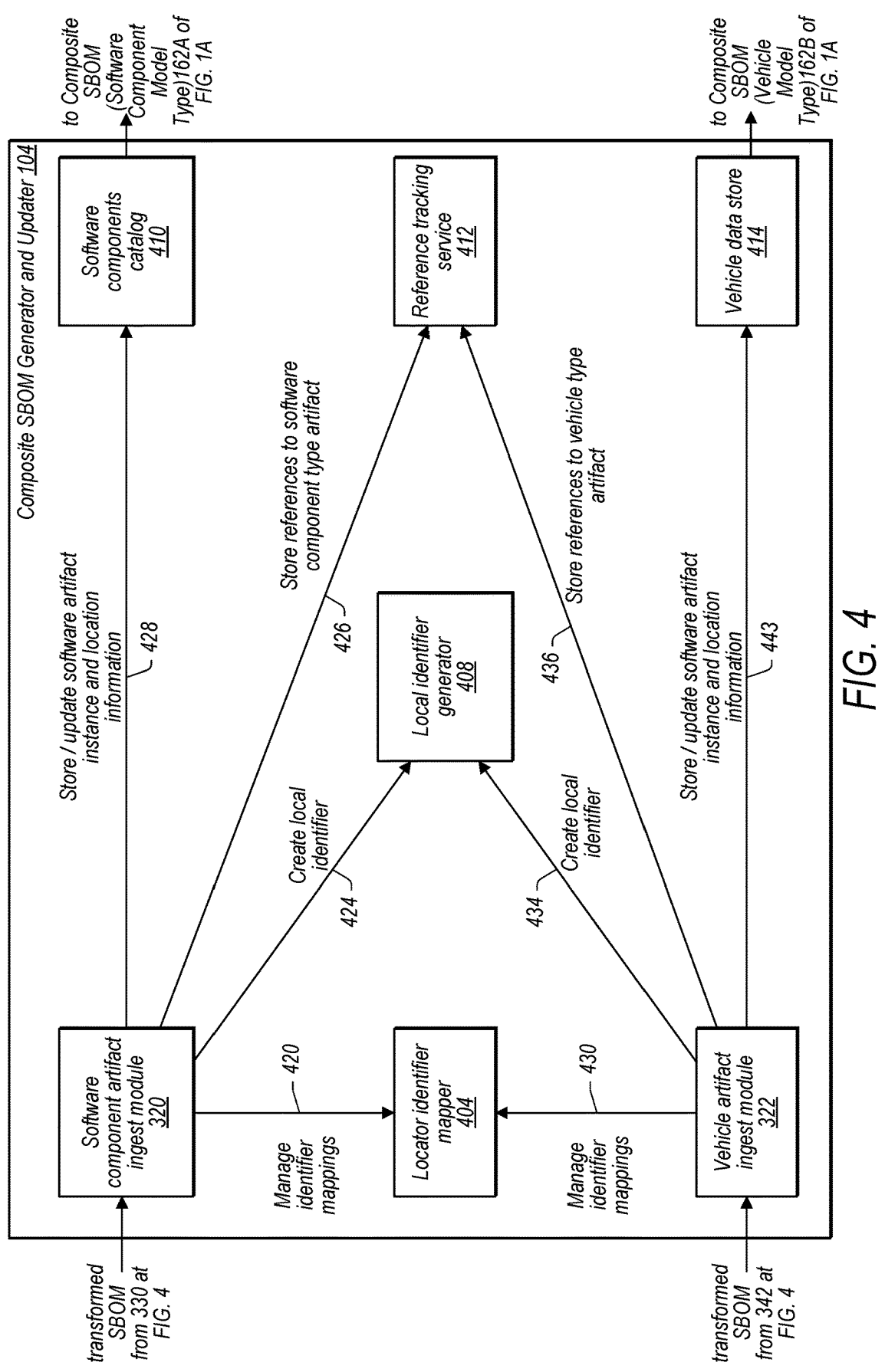
FIG. 4 illustrates a more detailed view of a composite SBOM generator and updater that generates a software artifact instance using one or more transformed SBOMs, according to some embodiments.

FIG. 4 illustrates a more detailed view of a composite SBOM generator and updater that generates a software artifact instance using one or more transformed SBOMs, according to some embodiments.

In some embodiments, a composite SBOM generator and updater 104 of a vehicle software bill of materials management and analysis service 100 may store location information (e.g., "locators") comprising a unique combination of a unique namespace and an external ID. For example, a software component artifact ingest module 320 may receive transformed SBOM from a data transformer 330, as discussed in FIG. 4. The software component artifact ingest module 320 may create 424 a unique local identifier using a local identifier generator 408 for a software artifact instance (of a software component model type) to be generated based on the transformed SBOM received. The software component artifact ingest module 320 may manage identifier mappings 420 using a locator identifier mapper 404 using the newly created unique local identifier that are used as the unique namespace of the locators. The identifier mappings are further discussed in FIG. 5. The software component artifact ingest module 320 may store 426 references to software component type artifact of the transformed SBOM using a reference tracking service 412. The reference tracking service 412 may manage references to software artifact instances using local identifiers, separate from the external ID. The reference tracking service 412 may allow independent processing of precedence rules, merge/split operations, and correction of faulty references independent of the external ID. In some embodiments, the software component artifact ingest module 320 may store or update software artifact instance and location information (e.g., locators) using software components catalog 410. The software components catalog 410 may provide the software artifact instance of software component model type to a composite SBOM 162A (of software component model type).

In some embodiments, the vehicle artifact ingest module 342 may create 434 a unique local identifier using the local identifier generator 408 for a software artifact instance (of a vehicle model type) to be generated based on the transformed SBOM received. The vehicle artifact ingest module 322 may manage identifier mappings 430 using the locator identifier mapper 404. The newly created unique local identifier may be used as a unique namespace for the locators. The locators are further discussed in FIG. 5. The vehicle artifact ingest module 322 may store 436 references to vehicle type artifact of the transformed SBOM using a reference tracking service 412. In some embodiments, the vehicle artifact ingest module 322 may store or update software artifact instance and location information (e.g., locators) using a vehicle data store 414. The vehicle data store 414 may provide the software artifact instance of vehicle model type to a composite SBOM 162B (of vehicle model type).

Figure 5:
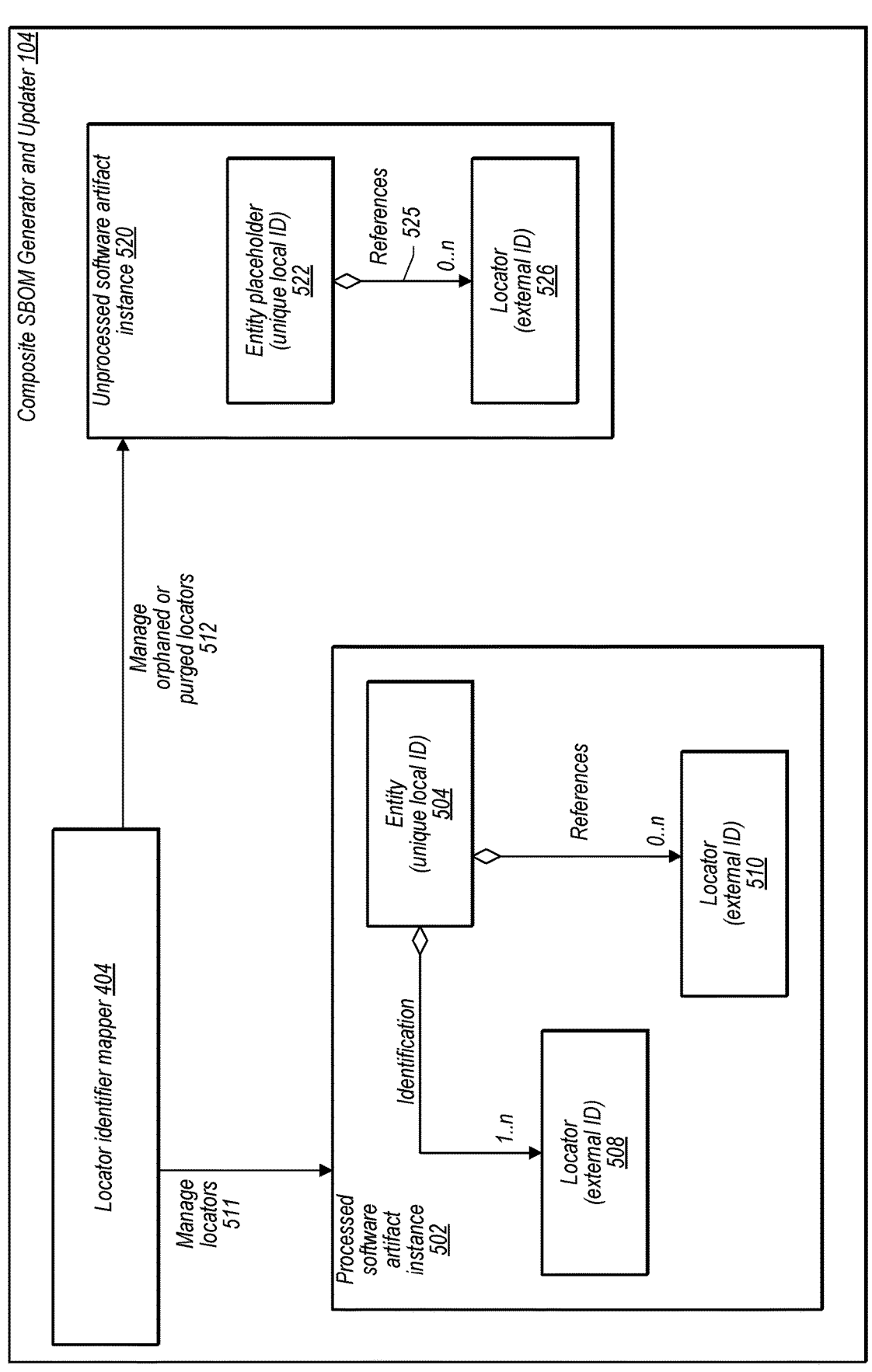
FIG. 5 illustrates a more detailed view of a software artifact instance, wherein the software artifact instance of a composite SBOM comprises location information, wherein the location information includes one or more external identifiers for one or more SBOMs used to generate the software artifact instance, according to some embodiments.

FIG. 5 illustrates a more detailed view of a software artifact instance, wherein the software artifact instance of a composite SBOM comprises location information, wherein the location information includes one or more external identifiers for one or more SBOMs used to generate the software artifact instance, according to some embodiments.

In some embodiments, a locator identifier mapper 404 of a composite SBOM generator and updater 104 may manage various locators. In some embodiments, the locators may be location information comprising a unique combination of a unique namespace and an external ID, as further discussed in FIG. 4. The locator identifier mapper 404 may manage 511 locators, wherein the locators are known entities (e.g., software artifact referenced in SBOM received). For example, the locator identifier mapper 404 may manage a processed software artifact instance 502 (e.g., a known or internal software artifact instance), wherein the processed software artifact instance 502 comprises an entity 504 that is known. In some embodiments, the entity 504 may have a unique local ID generated by the local identifier generator 408. The entity 504 may be mapped to a locator 508, wherein the locator 508 may have an external ID for a received SBOM that identifies the entity 504. In some embodiments, the entity 504 may be mapped to another locator 510, wherein the locator 510 may have another external ID for another received SBOM that the entity 504 is referenced by.

In some embodiments, the locator identifier mapper 404 may manage 512 orphaned or purged locators. For example, the locator identifier mapper 404 may manage an unprocessed software artifact instance 520 (e.g., an external or unknown software artifact instance software artifact instance), wherein an entity placeholder 522 is mapped to a locator 526. In some embodiments, the locator 526 may have an external ID for a received SBOM that the entity placeholder 522 is referenced by, wherein the SBOM is unprocessed. The locator identifier mapper 404 may update the entity placeholder 522 with a correct entity as relevant SBOM artifacts are processed (e.g., ingested).

Figure 6:
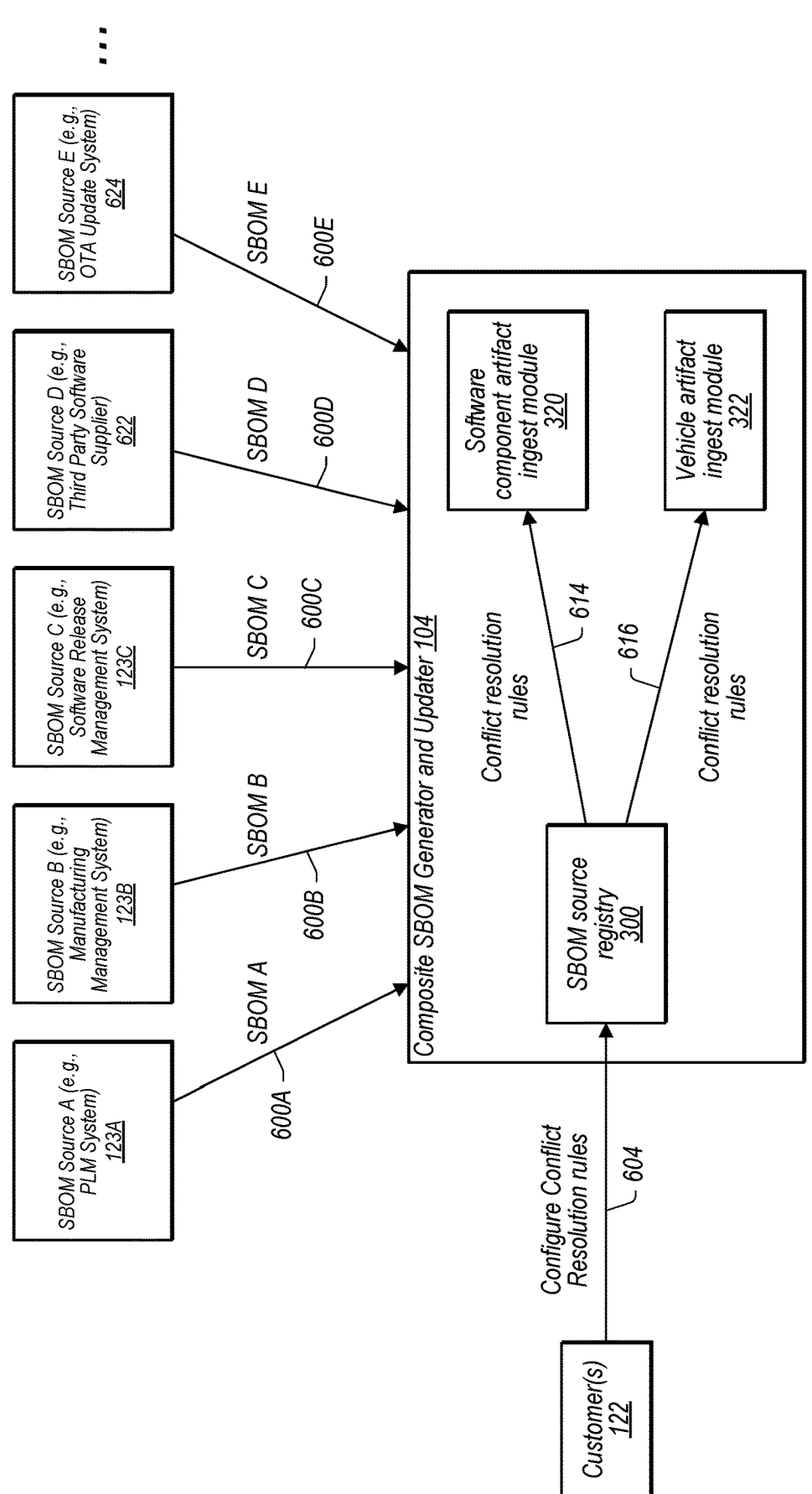
FIG. 6 illustrates a more detailed view of a composite SBOM generator and updater that resolves conflicts from different SBOMs used to generate a composite SBOM, according to some embodiments.

FIG. 6 illustrates a more detailed view of a composite SBOM generator and updater that resolves conflicts from different SBOMs used to generate a composite SBOM, according to some embodiments.

In some embodiments, a composite SBOM generator and updater 104 may receive a plurality of SBOMs from a plurality of SBOM sources. The composite SBOM generator and updater 104 may receive SBOM A 600A from a SBOM source A 123A, wherein the SBOM source A 123A may be a PLM system. The composite SBOM generator and updater 104 may receive SBOM B 600B from a SBOM source B 123B, wherein the SBOM source B 123B may be a manufacturing management system. The composite SBOM generator and updater 104 may receive SBOM C 600C from a SBOM source C 123C, wherein the SBOM source C 123C may be a software release management system. Additionally, the composite SBOM generator and updater 104 may receive SBOM D 600D from a SBOM source D 123D, wherein the SBOM source D 123D may be a third-party software supplier. In some embodiments, the third-party software supplier may be an external entity or company that provides software artifacts or solutions that are necessary for software functionalities. The third-party software supplier may provide infotainment systems, safety features, telematics systems, or other vehicle software. The SBOM D 600D may be tailored for software associated with a specific third-party software. In some embodiments, the composite SBOM generator and updater 104 may receive SBOM E 600E from a SBOM source E 123E, wherein the SBOM source E 123E may be an over-the-air (OTA) update system. The over-the-air (OTA) update system may provide remote updates for a software artifact in a vehicle. The SBOM E 600E may be tailored for describing OTA system functions, such as updating of software and performing encryption protocols. In some embodiments, one or more portions of the SBOMs received by the composite SBOM generator and updater 104 may overlap or conflict with one another. For example, there may be differences in software versions, dependencies, licenses, functionalities, and configurations between software artifact instances from the different SBOMs that are mapped to a same software artifact instance of a composite SBOM. These conflicts might arise when the different SBOMs from different SBOM sources require distinct versions of the same software artifact, leading to the conflict.

In some embodiments, a customer 122 may configure conflict resolution rules 604 stored in a SBOM source registry 300. The SBOM source registry 300 may store conflict resolution rules 614 and 616 that specify how overlapping or conflicting data from various SBOM Sources should be processed. The composite SBOM generator and updater 104 may use the conflict resolution rules 614 and 616 to determine which SBOM data takes precedence when conflicts arise during software artifact generation. For example, the conflict resolution rules 614 may be provided to software component artifact ingest module 320 and the conflict resolution rules 616 may be provided to a vehicle artifact ingest module 322 to resolve conflicts encountered between the various SBOMs received (e.g., SBOMs A-E 600A-600E).

Figure 7:
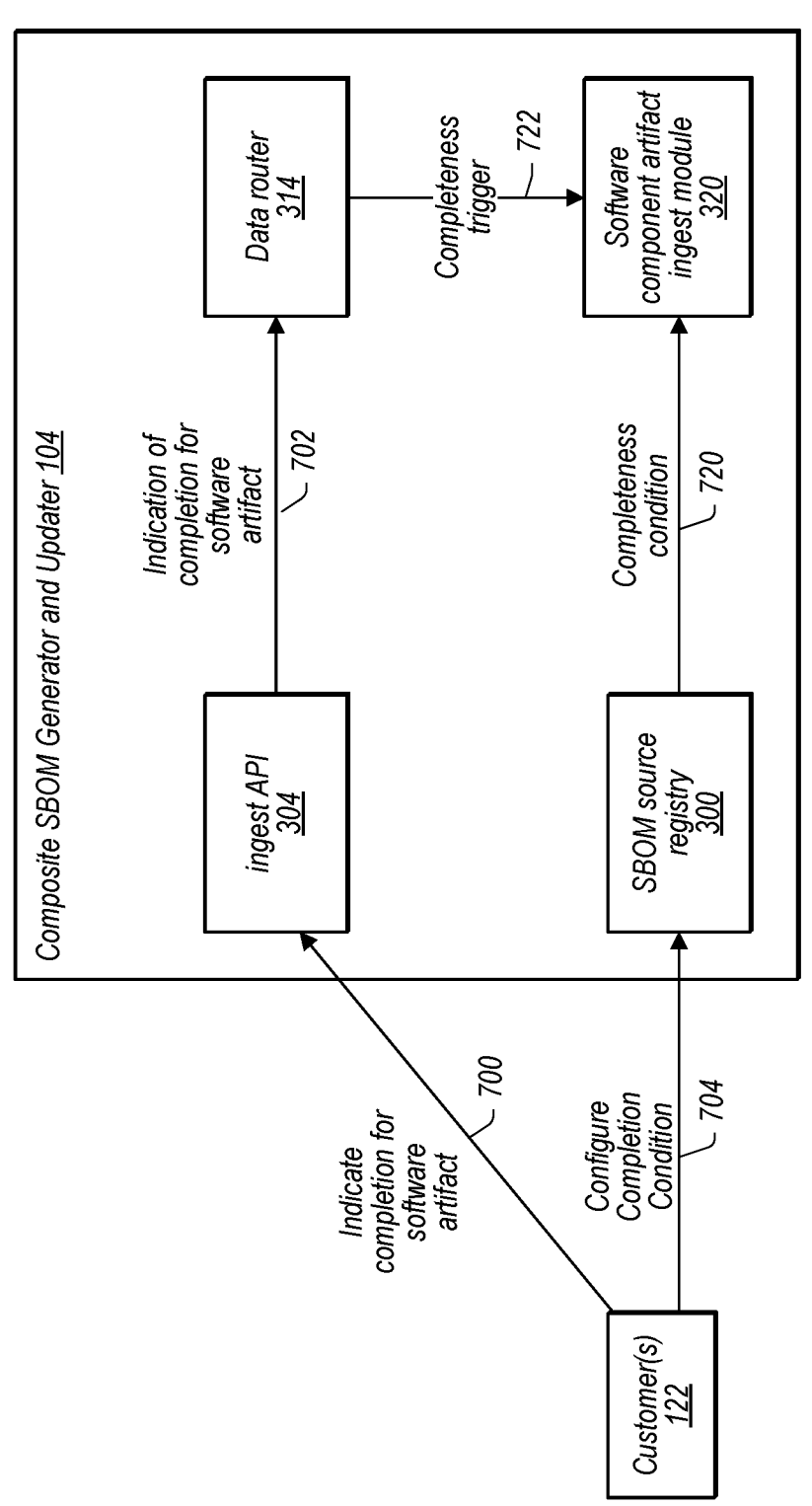
FIG. 7 illustrates a more detailed view of a composite SBOM generator and updater that labels one or more vehicle software artifact instances of a composite SBOM as completed and prevents the completed one or more vehicle software artifacts instances from being modified, according to some embodiments.

FIG. 7 illustrates a more detailed view of a composite SBOM generator and updater that labels one or more vehicle software artifact instances of a composite SBOM as completed and prevents the completed one or more vehicle software artifacts instances from being modified, according to some embodiments.

In some embodiments, a composite SBOM generator and updater 104 may determine, based on the vehicle software artifact instance completeness conditions, whether the one or more vehicle software artifact instances is to be labeled as completed. In some embodiments, a customer 122 may configure completion condition 704 stored in a SBOM source registry 300. For example, a completion condition 704 may be an indication that the software artifact has reached a certain performance criterion, such as response times, throughput, or resource utilization. In some embodiments, the completeness conditions may be based on satisfaction of one or more testing/certification requirements. In another example, the completion condition 704 may be an indication of certain version number or an indication that the software has been deployed.

Based on completeness condition 720 obtained by the software component artifact ingest module 320, the SBOM generator and updater 104 may label one or more vehicle software artifact instances as completed. The composite SBOM generator and updater 104 may furthermore configure the one or more vehicle software artifact instances to be prevented from being modified based on the label indicating the software artifact instance as complete. In some embodiments, the customer 122 may indicate 700 a completeness label for a software artifact instance. The customer 122 may make an explicit application programming interface (API) call to an ingest API 304 to mark a specific software artifact instance as complete. In some embodiments, the ingest API 304 may provide the indication of completion 702 to a data router 314, which may send a completeness trigger 722 to the software component artifact ingest module 320 to update (or generate) the specified software artifact instance as complete.

Figure 8:
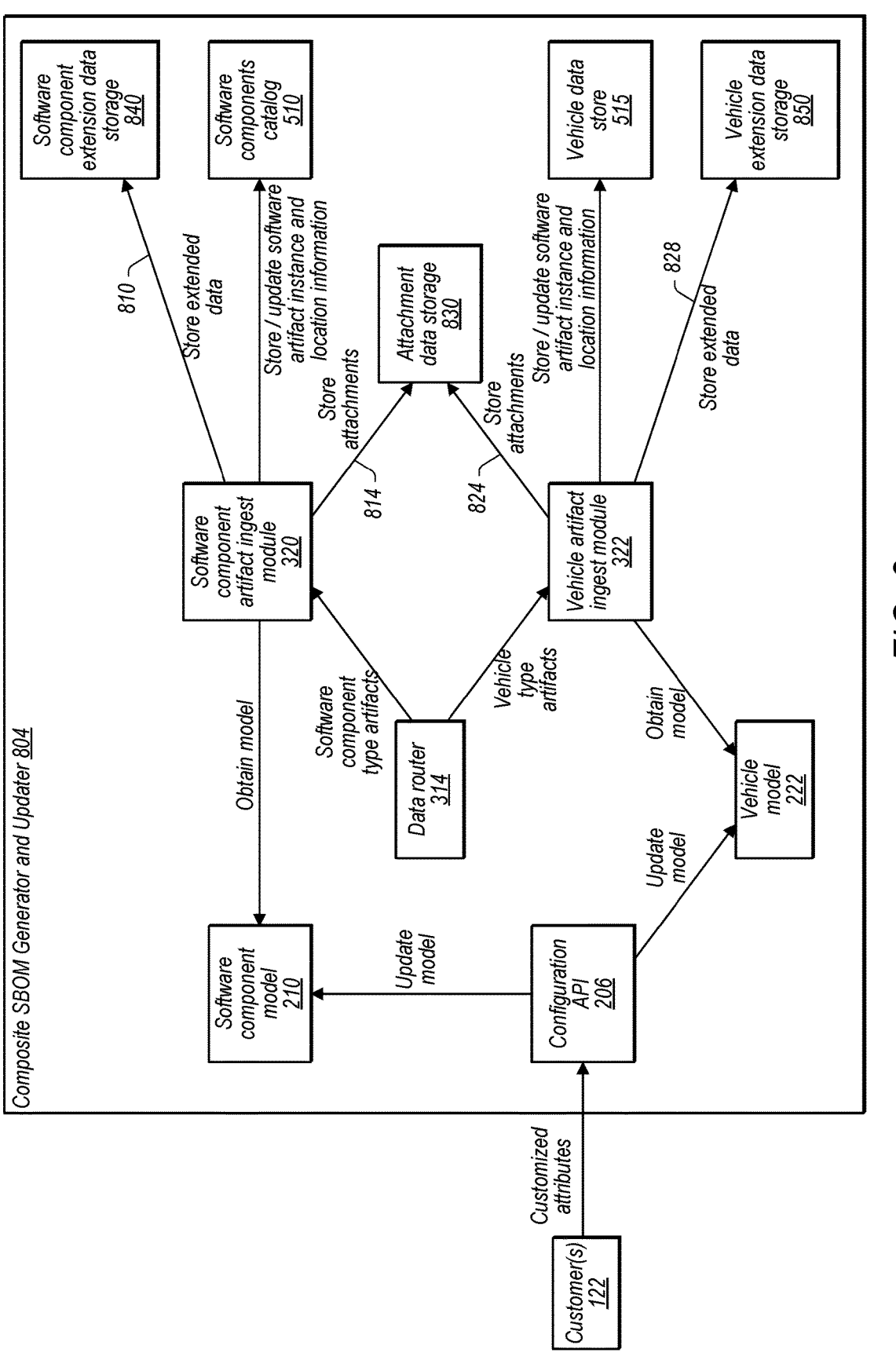
FIG. 8 illustrates a more detailed view of a composite SBOM generator and updater that receives additional metadata associated with one or more vehicle software artifact instances of a composite SBOM and stores the additional metadata, according to some embodiments.

FIG. 8 illustrates a more detailed view of a composite SBOM generator and updater that receives additional metadata associated with one or more vehicle software artifact instances of a composite SBOM and stores the additional metadata, according to some embodiments.

In some embodiments, a composite SBOM generator and updater 804 may further comprise software component extension data storage 840, attachment data storage 830, and vehicle extension data storage 850. A software component extension data storage 840 may store 810 extended data associated with a software artifact instance (e.g., a software component model type instance) to be generated based on the received SBOM. For example, a software component artifact ingest module 320 may receive extended data in addition to attribute information stored using the software artifact instance. The extended data may be metadata, wherein the metadata comprises one or more of data logs, dependency information outlining dependent libraries, software artifact contributor information, and licensing information. In some embodiments, an attachment data storage 830 may store attachments 814 associated with a software artifact instance to be generated based on the received SBOM. The attachments may comprise one or more of code documentations, test results, certification data, or binaries. In some embodiments, a vehicle artifact ingest module 322 may receive extended data in addition to attribute information stored using the software artifact instance. A vehicle extension data storage 850 may store 828 extended data associated with a software artifact instance (e.g., a vehicle model type instance) to be generated based on the received SBOM. In some embodiments, the attachment data storage 830 may similarly store 824 attachments associated with software artifact instance (e.g., a vehicle model type instance) to be generated based on the received SBOM.

Figure 9:
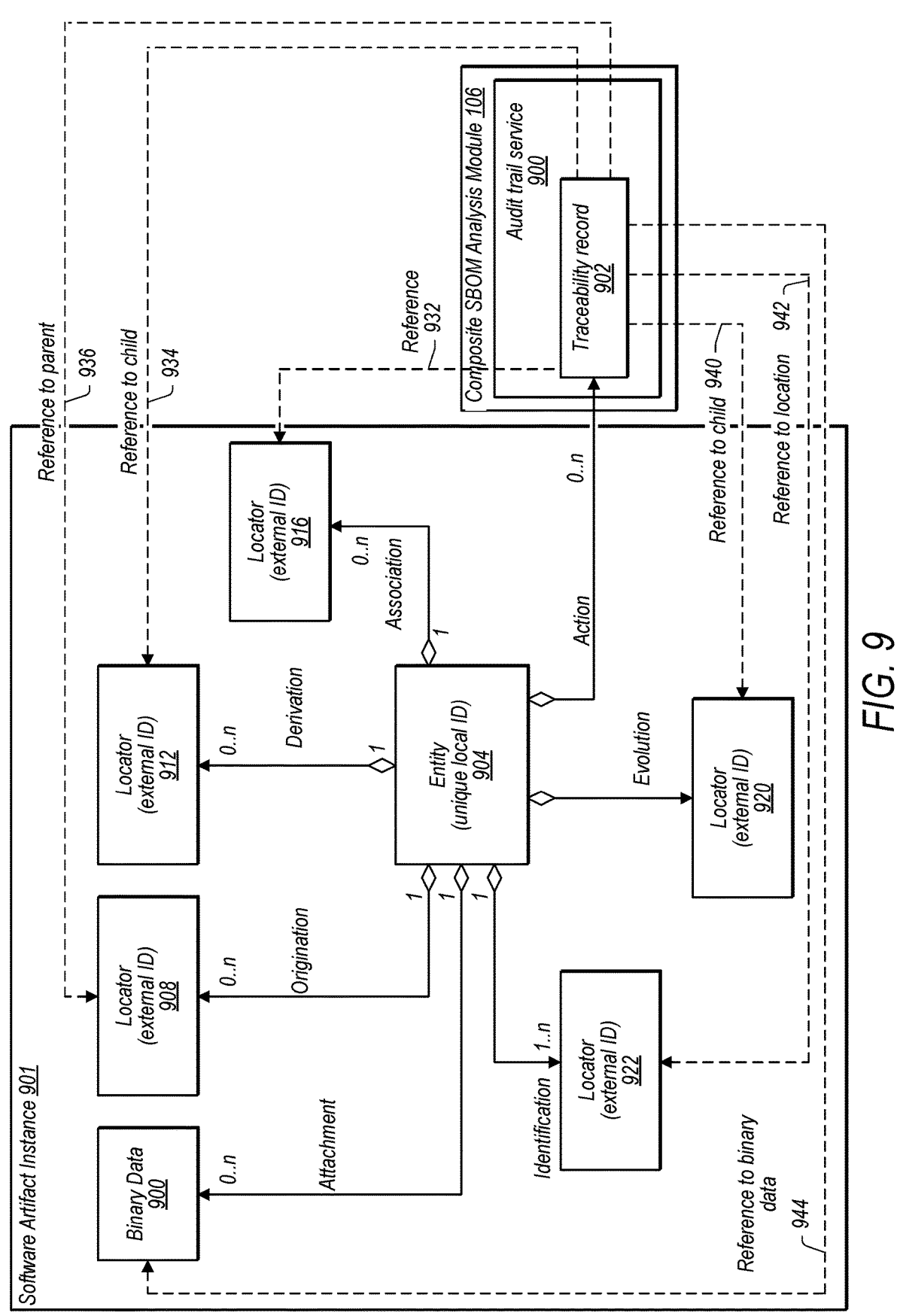
FIG. 9 illustrates a more detailed view of a composite SBOM analysis module that uses traceability record associated with a software artifact instance of a composite SBOM to perform an audit of changes in the software artifact instance, according to some embodiments.

FIG. 9 illustrates a more detailed view of a composite SBOM analysis module that uses traceability record associated with a software artifact instance of a composite SBOM to perform an audit of changes in the software artifact instance, according to some embodiments.

In some embodiments, a composite SBOM analysis module 106 may enable auditability by tracking one or more changes to the vehicle software artifact over time. For example, the composite SBOM analysis module 106 may comprise an audit trail service 900 that maintains a traceability records for respective software artifact instances. For example, a traceability record 902 may track changes to a software artifact instance 901, wherein the software artifact instance 901 comprises multiple locators and attached binary data 900. For example, the software artifact instance 901 may comprise entity 904 having a unique local ID generated by a local identifier generator, further discussed in FIG. 5. The entity 904 may be mapped to a locator 908, and wherein the locator 908 may have an external ID for a received SBOM, wherein the received SBOM is a SBOM that entity 904 originates from. In some embodiments, the entity 904 may be mapped to a locator 912, wherein the locator 912 may have an external ID for a received SBOM, and wherein the received SBOM is a SBOM that the entity 904 derives from. In some embodiments, the entity 904 may be mapped to a locator 916, wherein the locator 916 may have an external ID for a received SBOM, and wherein the received SBOM is a SBOM that the entity 904 forms an association with. In some embodiments, the entity 904 may be mapped to a locator 920, wherein the locator 920 may have an external ID for a received SBOM, and wherein the received SBOM is a SBOM that the entity 904 evolves from. In some embodiments, the entity 904 may be mapped to a locator 922, wherein the locator 922 may have an external ID for a received SBOM, and wherein the received SBOM is a SBOM that the entity 904 is identified by.

The audit trail service 900 may use the traceability record 902 may maintain a reference 936 to a parent SBOM record indicated in the locator 908 along with all subsequent changes made to the locator 908. In some embodiments, the audit trail service 900 may use the traceability record 902 may maintain a reference 934 to a child SBOM record indicated in the locator 912 along with all subsequent changes made to the locator 912. In some embodiments, the audit trail service 900 may use the traceability record 902 may maintain a reference 932 maintained in the locator 916 along with all subsequent changes made to the locator 916. In some embodiments, the audit trail service 900 may use the traceability record 902 may maintain a reference 940 to a child SBOM record indicated in the locator 920 along with all subsequent changes made to the locator 920. In some embodiments, the audit trail service 900 may use the traceability record 902 may maintain a reference 942 to a location of the SBOM record indicated in the locator 922 along with all subsequent changes made to the locator 922. In some embodiments, the audit trail service 900 may use the traceability record 902 may maintain a reference 944 to binary data indicated in the binary data 900 along with all subsequent changes made to the binary data 900. The traceability record 902 may be audited to verify whether a vehicle (and the vehicle software system on the vehicle) complies with one or more safety protocols or other industry standards.

Figure 10:
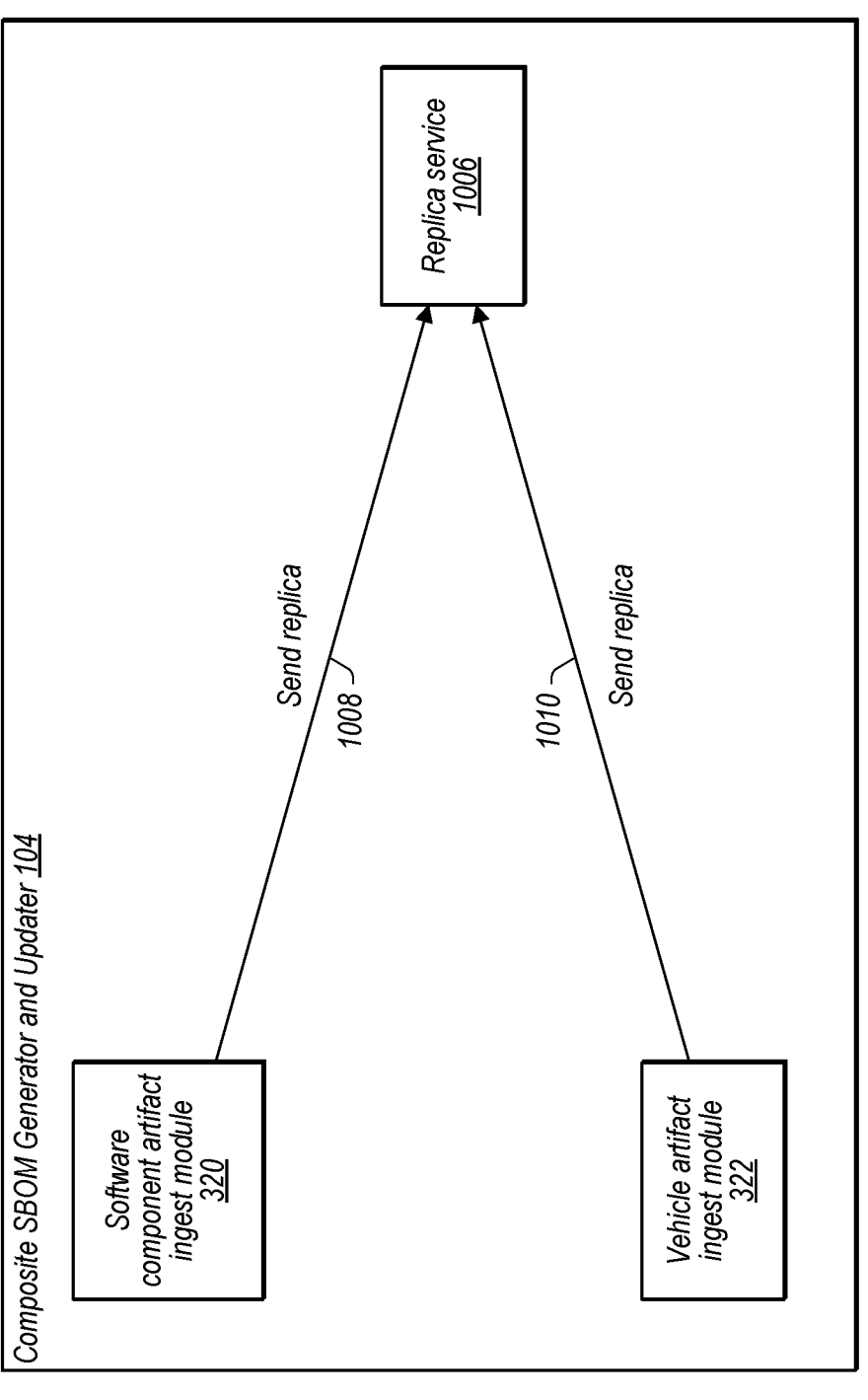
FIG. 10 illustrates a more detailed view of a composite SBOM generator and updater that selectively stores past versions of received SBOMs, according to some embodiments.

FIG. 10 illustrates a more detailed view of a composite SBOM generator and updater that selectively stores past versions of received SBOMs, according to some embodiments.

In some embodiments, composite SBOM generator and updater 104 may comprise a replica service 1006 that selectively stores historical replicas of SBOMs received. For example, a software component artifact ingest module 320 may send 1008 a replica of one or more portions of the SBOM used to generate a software artifact instance (of the software component model type). Similarly, a vehicle artifact ingest module 322 may send 1008 a replica of one or more portions of the SBOM used to generate a software artifact instance (of the vehicle model type). The replica service 1006 may selectively retain the replica of the one or more portions of the SBOM as subsequent updated SBOMs are ingested. The replica service 1006 may select which of SBOM (or portions of SBOM) to retain based on a specified retention policy. In some embodiments, the replica service may store a history of merge or split operations used to generate the composite SBOM. In some embodiments, the replica service may store software artifact instances generated by the composite SBOM generator and updater 104 that have been subsequently used as additional inputs to the composite SBOM generator and updater 104 (e.g., software artifact instances that are to be merged or split to correct for an error in the composite SBOM, as further discussed in FIG. 11). In some embodiments, a customer may configure the specified retention policy as part of composite SBOM management request 124 sent to the composite SBOM generator and updater 104.

Figure 11:
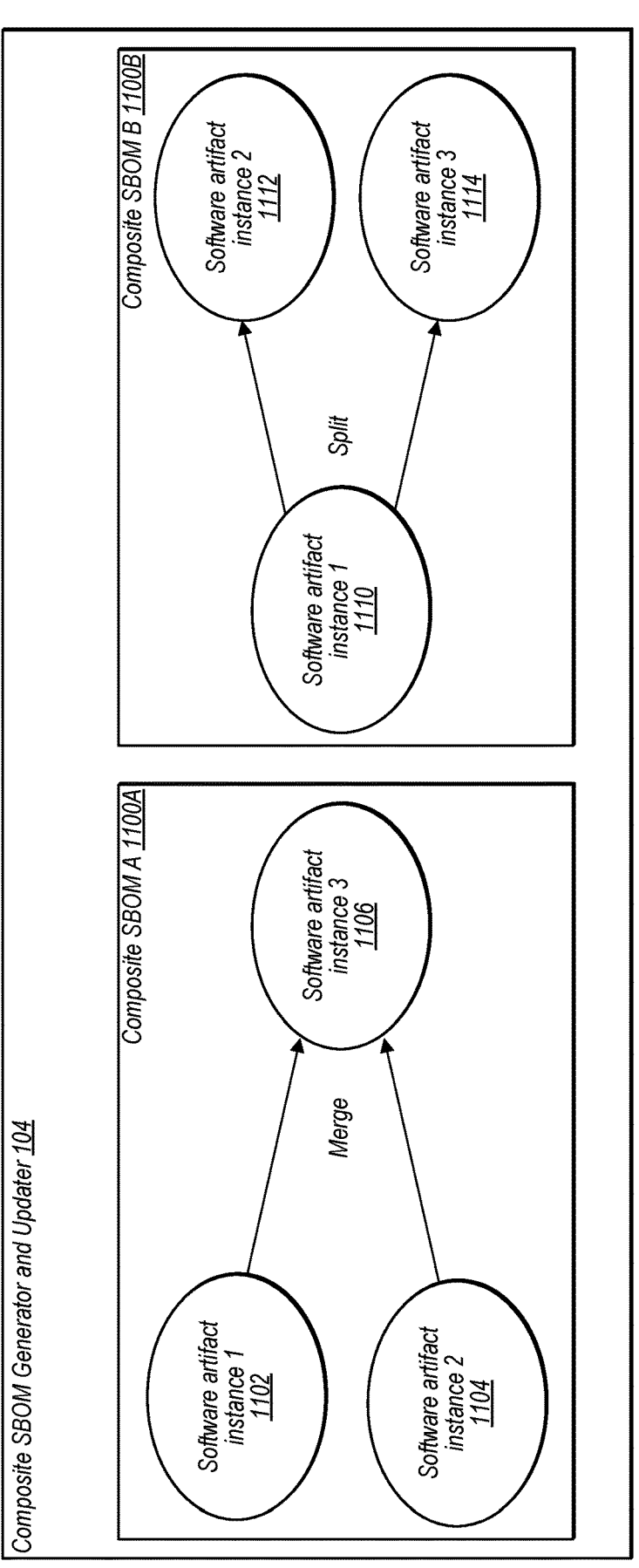
FIG. 11 illustrates a more detailed view of a composite SBOM generator and updater that merges multiple vehicle software artifact instances of a composite SBOM into a single vehicle software artifact instance, or splits a single software artifact instance of the composite SBOM into multiple vehicle software artifact instances, according to some embodiments.

FIG. 11 illustrates a more detailed view of a composite SBOM generator and updater that merges multiple vehicle software artifact instances of a composite SBOM into a single vehicle software artifact instance, or splits a single software artifact instance of the composite SBOM into multiple vehicle software artifact instances, according to some embodiments.

In some embodiments, a composite SBOM generator and updater 104 may manage merge and split operations for potentially immutable software artifacts instances. The composite SBOM generator and updater 104 may correct defects or irregularities that occur during software artifact instance generation as discussed in FIGS. 1-10. In some embodiments, the composite SBOM generator and updater 104 may merge software artifact instance (1) 1102 and software artifact instance (2) 1104 and generate software artifact instance (3) 1106 for a composite SBOM A 1100A. For example, the software artifact instance (1) 1102 and software artifact instance (2) 1104 may be merged based on a correction that two different attributes occurring in the software artifact instance (1) 1102 and the software artifact instance (2) 1104 are to be the same attribute. In some embodiments, the composite SBOM generator and updater 104 may split software artifact instance (3) 1110 to generate the software artifact instance (1) 1112 and the software artifact instance (2) 1114 for a composite SBOM B 1100B. For example, the composite SBOM generator and updater 104 may split the software artifact instance (3) 1110 based on a correct that an attribute for a single software artifact instance is meant to be for two separate software artifact instances.

Figure 12:
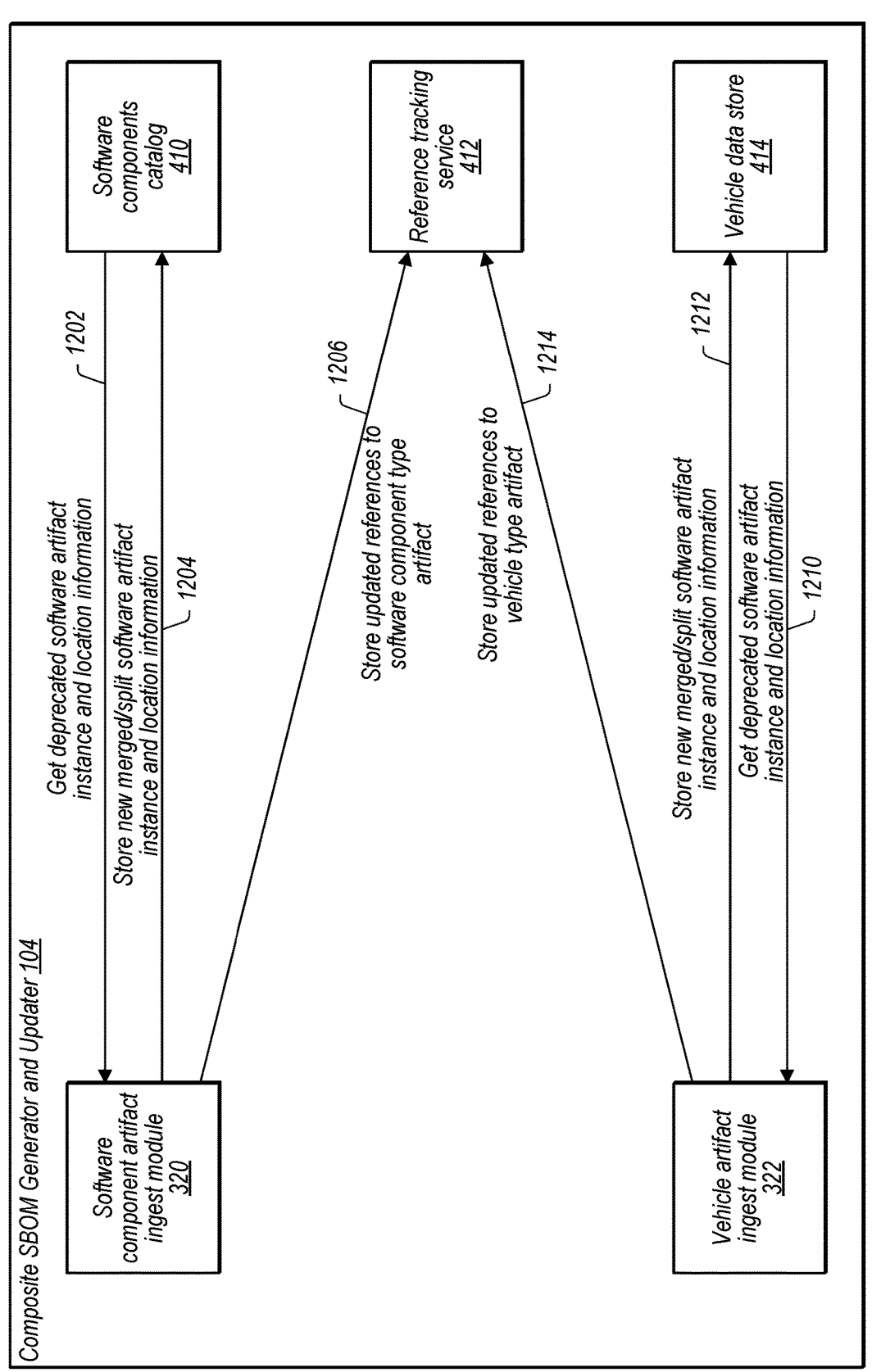
FIG. 12 illustrates a more detailed view of a composite SBOM generator and updater that updates location information for one or more vehicle software artifact instances of a composite SBOM based on merging or splitting of the one or more software artifact instances, according to some embodiments.

FIG. 12 illustrates a more detailed view of a composite SBOM generator and updater that updates location information for one or more vehicle software artifact instances of a composite SBOM based on merging or splitting of the one or more software artifact instances, according to some embodiments.

In some embodiments, a software component artifact ingest module 320 may get 1202 deprecated software artifact instance (of software component model type) and location information from software components catalog 410 to generate new merged/split software artifact instance and location information based on merge/split operations, further discussed at FIG. 11. The software components catalog 410 may store 1204 the new merged/split software artifact instance and location information. Additionally, a reference tracking service 412 may store 1206 updated references to software component type artifact based on the merge/split operations. Similarly, a vehicle artifact ingest module 322 may get 1210 deprecated software artifact instance and location information from a vehicle data store 414 to generate new merged/split software artifact instance and location information based on merge/split operations, further discussed at FIG. 11. The vehicle data store 414 may store 1212 the new merged/split software artifact instance (of vehicle model type) and location information. Additionally, the reference tracking service 412 may store 1214 updated references to vehicle type artifact based on the merge/split operations.

Figure 13:
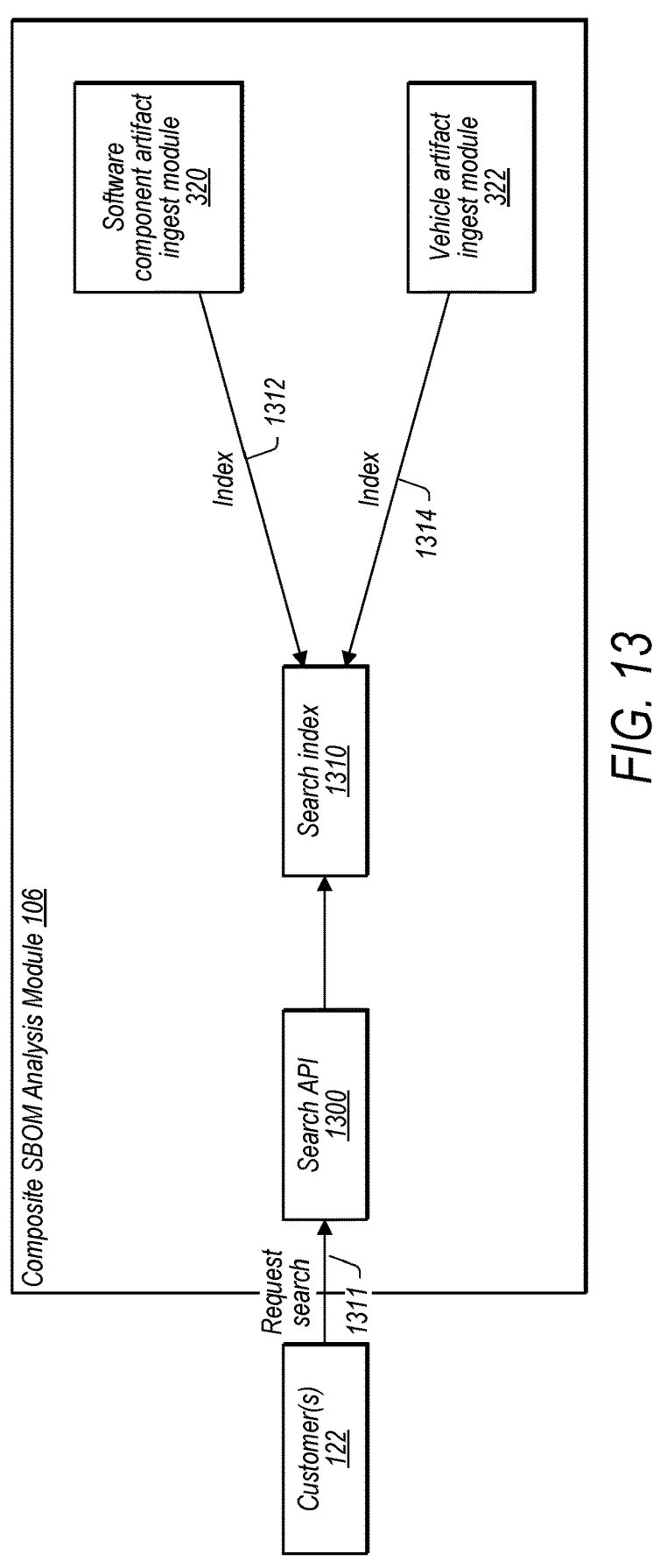
FIG. 13 illustrates a more detailed view of a composite SBOM analysis module that provides full text search index for identifying one or more vehicle software artifact instances of a composite SBOM, according to some embodiments.

FIG. 13 illustrates a more detailed view of a composite SBOM analysis module that provides full text search index for identifying one or more vehicle software artifact instances of a composite SBOM, according to some embodiments.

In some embodiments, a composite SBOM analysis module 106 may provide a full-text search capability for software artifact instances, including software artifact instance of a software component model type and vehicle model type. In some embodiments, a customer 122 may request 1311 search for a specific software component artifact to a search API 1300. The search API 1300 may utilize search index 1310 to perform the search, wherein the search index 1310 may parse the request and obtain relevant index 1312 associated with a requested software artifact instance (of a software component model type) from a software component artifact ingest module 320. Similarly, the search API 1300 may utilize the search index 1310 to perform the search, wherein the search index 1310 may parse the request and obtain relevant index 1314 associated with a requested software artifact instance (of a vehicle model type) from a vehicle artifact ingest module 322. In some embodiments, the search API 130 may use natural language processing (NLP) techniques to parse a received search request and identify additional details, (including software versions, dependencies, associated vehicles, or pertinent documentation) for a request software artifact instance. The search API 1300 may leverage the additional details to perform the search.

Figure 14:
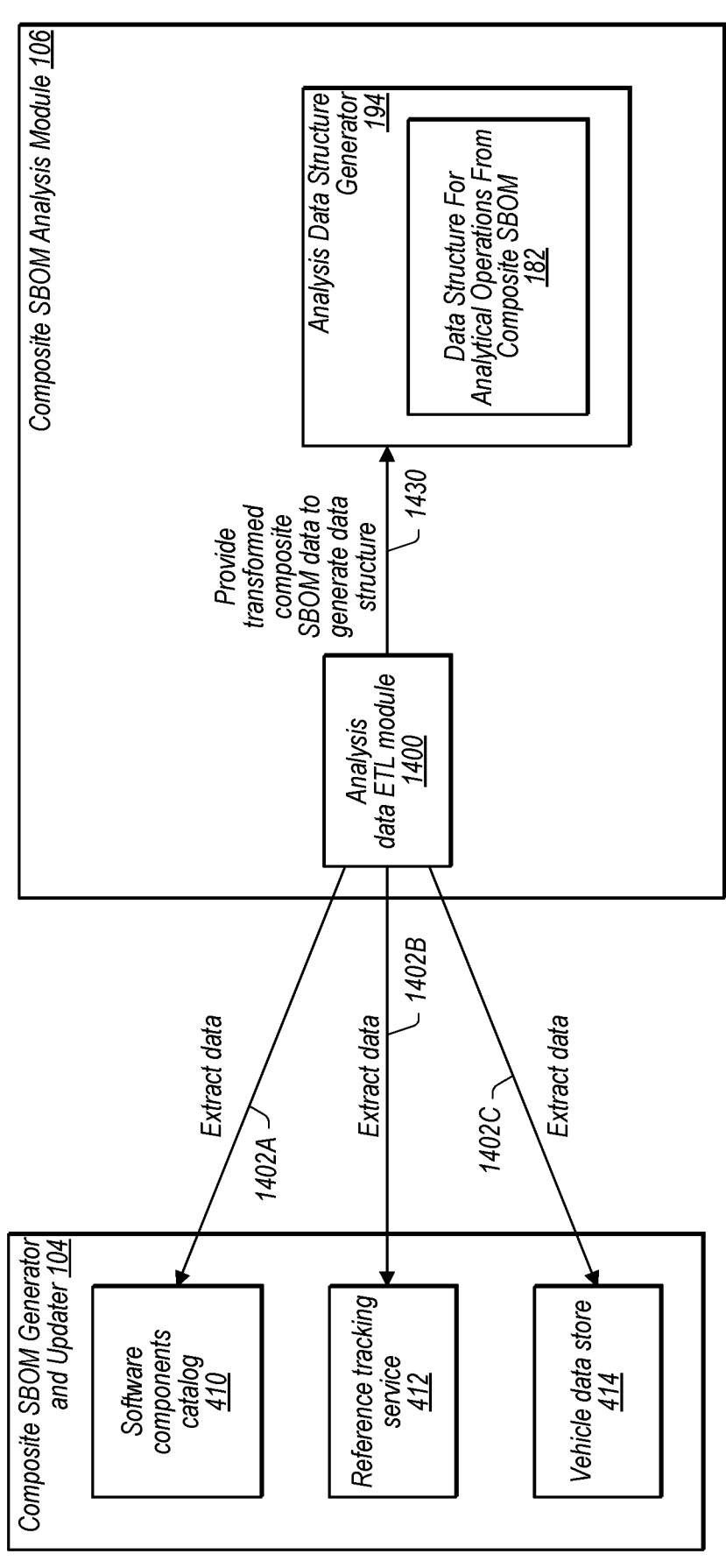
FIG. 14 illustrates a more detailed view of a composite SBOM analysis module that formats a composite SBOM into a data structure for analysis operation, according to some embodiments.

FIG. 14 illustrates a more detailed view of a composite SBOM analysis module that formats a composite SBOM into a data structure for analysis operation, according to some embodiments.

In some embodiments, an analysis data extract, transform, and load (ETL) module 1400 of a composite SBOM analysis module 106 may extract data from one or more sources in a composite SBOM generator and updater 104. An analysis data structure generator 194 may format the extracted data to generate a data structure for analytical operations from composite SBOM 182. For example, the analysis data ETL module 1400 may extract 1402A data from software components catalog 410, may extract 1402B data from a reference tracking service 412, and may extract 1402C data from a vehicle data store 414. The analysis data ETL module 1400 may gather diverse data sets associated with the composite SBOM and perform series of transformations. The transformation may involve cleaning, standardizing, or enriching the composite SBOM data to ensure compatibility with the data structure for analytical operations from composite SBOM 182. For instance, disparate formats and structures are unified into a standardized schema suitable for analytical processing using a property graph data structure. The transformed composite SBOM data may be loaded, wherein the analysis data ETL module 1400 organized the SBOM data hierarchically or apply one or more indexing protocols. The analysis data ETL module 1400 may provide 1430 the transformed composite SBOM data to the analysis data structure generator 194. In some embodiments, the analysis data structure generator 194 may determine a granularity of specificity of a plurality of granularities of specificity included in the composite SBOM. For example, the analysis data structure generator 194 may generate a data structure, wherein a property graph comprises nodes that represent the vehicle software artifacts instances of the composite SBOM, and wherein the property graph represents the vehicle software artifact instances at a particular granularity of specificity of a plurality of granularities of specificity included in the composite SBOM (e.g., select a particular granularity of specificity where subcomponents of software artifacts are separate nodes). The analysis data ETL module 1400 may receive updates to composite SBOM data, and based on the updates, the analysis data structure generator 194 may update the data structure for analytical operations from composite SBOM 182. For example, the data structure for analytical operations from composite SBOM 182 may be a property graph. Based on updates to a composite SBOM received by the analysis data ETL module 1400, the data structure generator 194 may perform: addition of another node representing another software artifact instance, removal of a node in the property graph, or change to one or more properties of a node of the property graph.

Figure 15A:
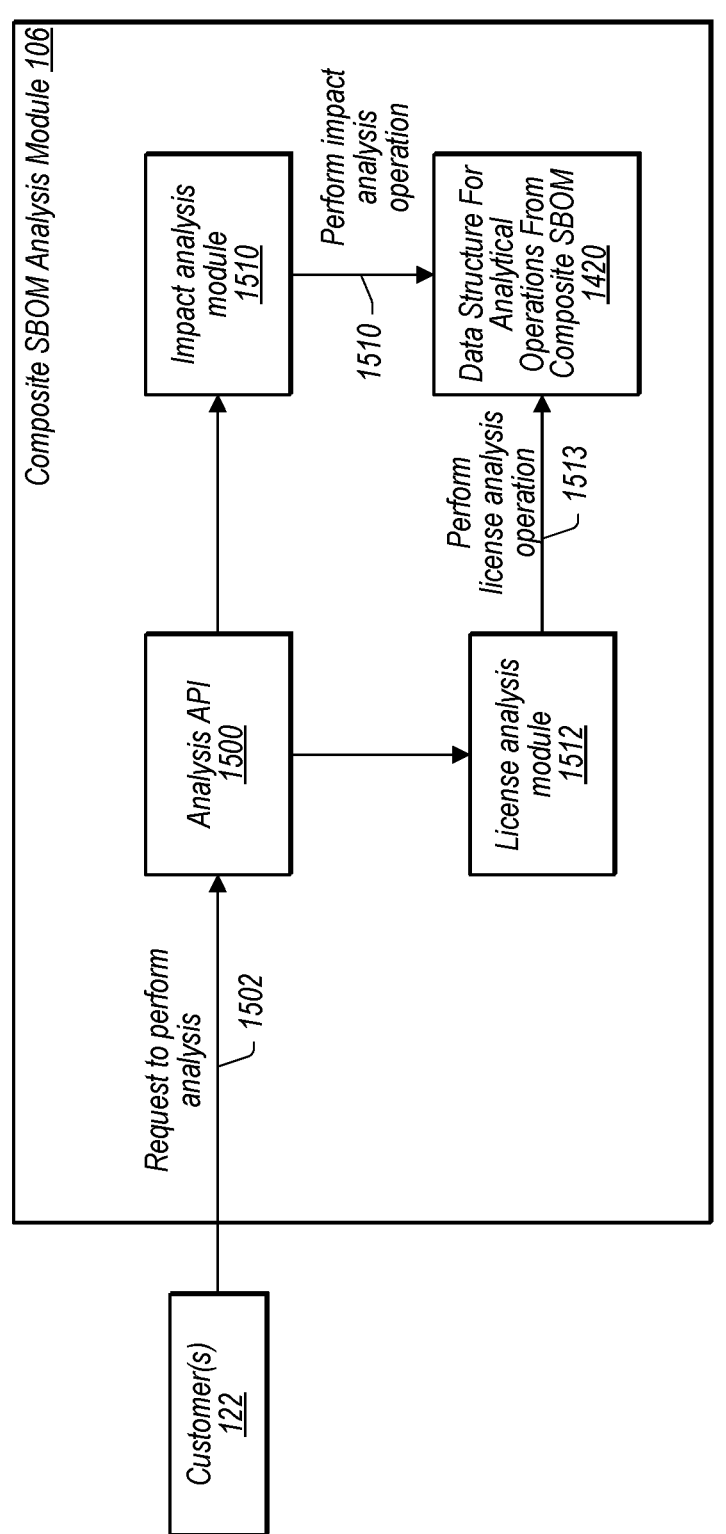
FIG. 15A illustrates a more detailed view of a composite SBOM analysis module that performs an impact analysis and a license analysis using a data structure for analysis operation, according to some embodiments.

FIG. 15A illustrates a more detailed view of a composite SBOM analysis module that performs an impact analysis and a license analysis using a data structure for analysis operation, according to some embodiments.

In some embodiments, a composite SBOM analysis module 106 may perform one or more analytical operations using an analysis API 1500. For example, a customer 122 may request 1502 to perform analysis using a data structure for analytical operations from composite SBOM 1420. In some embodiments, the analysis API 1500 may determine that the request is a request to perform an impact analysis, and may send the request to an impact analysis module 1510. The impact analysis module 1510 may be a part of analysis core 196 discussed in FIG. 1B. The impact analysis module 1510 may perform 1510 impact analysis operation using the data structure for analytical operations from composite SBOM 1420, wherein the impact analysis operation may comprise traversing components of the data structure for analytical operations from composite SBOM 1420. Based on the traversal, the impact analysis module 1510 may evaluate repercussions that a deployment of a software artifact would have on related software artifacts. The impact analysis module 1510 may provide insights of how a deployment of the software artifact may cascade across a suite of software artifacts in a vehicle.

In some embodiments, the analysis API 1500 may determine that the request is a request to perform a license analysis. The analysis API 1500 may send the request to a license analysis module 1512, wherein the license analysis module 1512 may be a part of analysis core 196 discussed in FIG. 1B. The license analysis module 1512 may perform 1513 license analysis operation using the data structure for analytical operations from composite SBOM 1420. For example, the data structure for analytical operations from composite SBOM 1420 may be a property graph wherein each node represents a distinct software artifact, and the edges delineate their dependencies and interactions. The property graph may be labeled with specific licensing information, such as license types, restrictions, and permissible use cases for each software artifact. The license analysis module 1512 may traverse the property graph and assess licensing implications associated with each software artifact. The license analysis module 1512 may determine predefined license constraints, identify potential conflicts or violations, and provide detailed insights into the compliance status as it traverses the property graph.

Figure 15B:
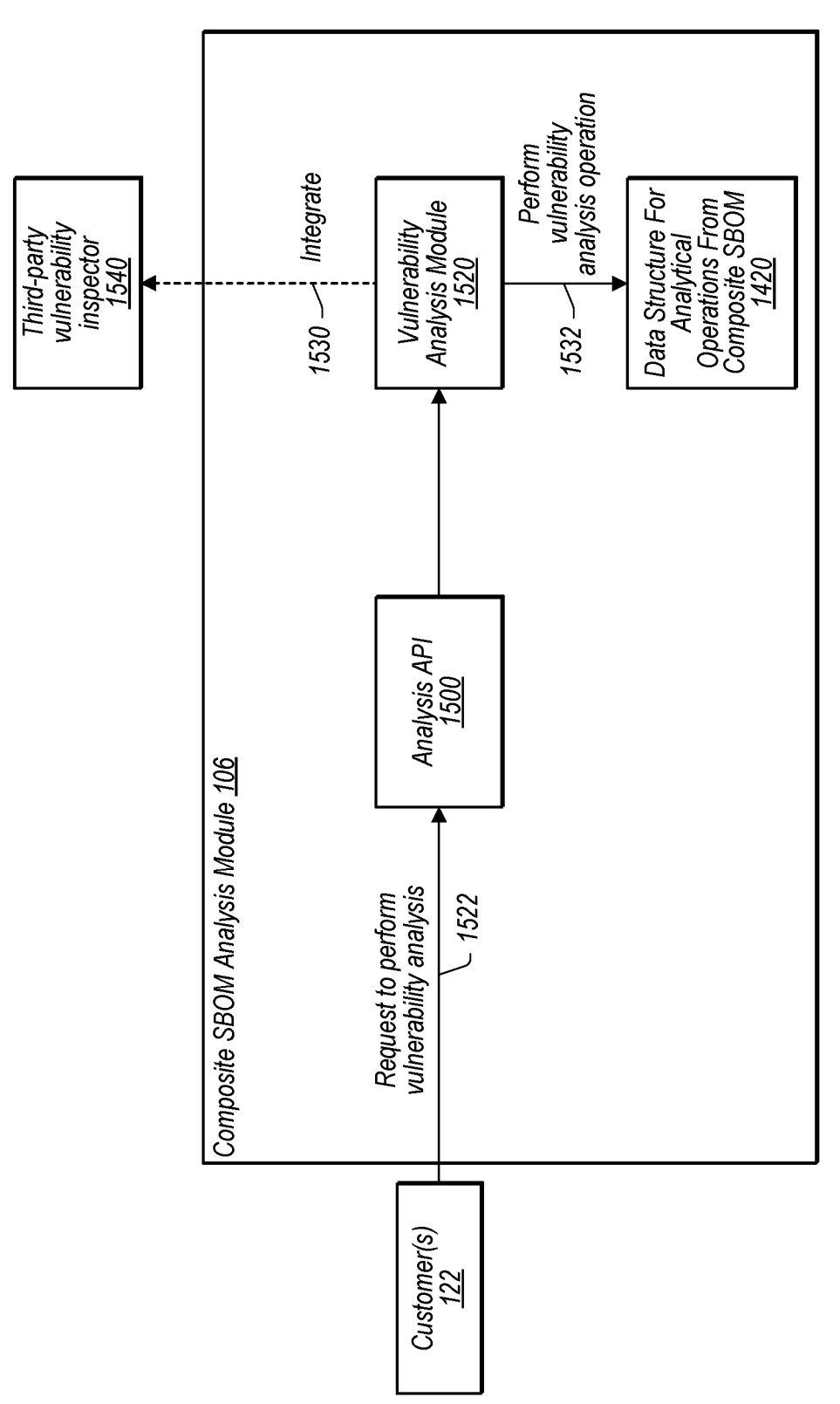
FIG. 15B illustrates a more detailed view of a composite SBOM analysis module that performs a vulnerability analysis using a data structure for analysis operation, according to some embodiments.

FIG. 15B illustrates a more detailed view of a composite SBOM analysis module that performs a vulnerability analysis using a data structure for analysis operation, according to some embodiments.

In some embodiments, a composite SBOM analysis module 106 may perform one or more analytical operations using an analysis API 1500. For example, a customer 122 may request 1522 to perform vulnerability analysis using a data structure for analytical operations from composite SBOM 1420. In some embodiments, the analysis API 1500 may determine that the request is a request to perform a vulnerability analysis, and may send the request to a vulnerability module 1520. The vulnerability analysis module 1512 may be a part of analysis core 196 discussed in FIG. 1B. The vulnerability analysis module 1512 may perform 1532 vulnerability analysis operation using the data structure for analytical operations from composite SBOM 1420, wherein the impact analysis operation may comprise traversing components of the data structure for analytical operations from composite SBOM 1420. Based on the traversal, the impact analysis module 1510 may evaluate vulnerability types, severity levels, patch status, and dependencies of each data structure components (e.g., nodes). The vulnerability analysis module 1512 may traverses the data structure for analytical operations from composite SBOM 1420 to assess potential weaknesses, predict exploitability scenarios, and forecast the potential impact of these vulnerabilities across a vehicle. In some embodiments, the vulnerability analysis module 1512 may integrate 1530 a third-party vulnerability inspector 1540, wherein the third-party vulnerability inspector 1540 performs the vulnerability analysis operation using the data structure for analytical operations from composite SBOM 1420.

Figure 16:
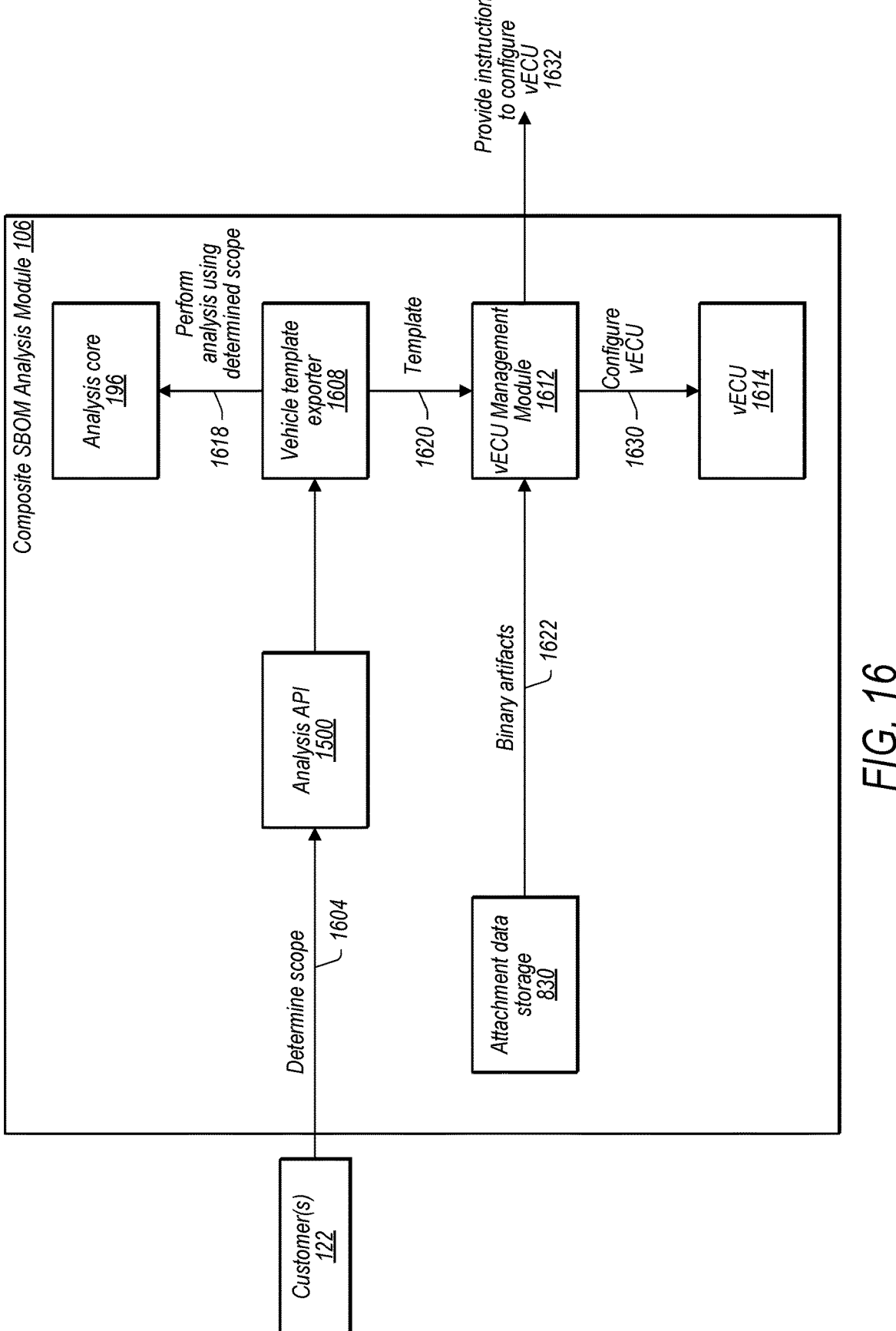
FIG. 16 illustrates a more detailed view of a composite SBOM analysis module that generates one or more virtual electronic control units (vECUs) using a vehicle template exporter, according to some embodiments.

FIG. 16 illustrates a more detailed view of a composite SBOM analysis module that generates one or more virtual electronic control units (vECUs) using a vehicle template exporter, according to some embodiments.

In some embodiments, a customer 122 may determine 1604 scope of a composite SBOM to use for an analysis operation or vECU generation. For example, an analysis API 1500 may send the determined scope of the composite SBOM to a vehicle template exporter 1608. The vehicle template exporter 1608 may instruct an analysis core 196 to perform 1618 an analysis using data structure for analytical operations using parts of a data structure associated only with the determined scope of the composite SBOM. Furthermore, the vehicle template exporter 1608 may send a template 1620 to a vECU management module 1612, wherein the template indicates a scope of the composite SBOM to use in configuring a vECU. The template may comprise indications of software artifact, configuration, and deployment metadata associated with only within the indicated scope for the composite SBOM. The vECU management module 1612 may obtain binary artifacts 1622 from an attachment data storage 830 and configure 1630 a vECU 1614, wherein the configured vECU 1614 may be stored in the composite SBOM analysis module 106. In some embodiments the vECU management module 1612 may provide 1632 instructions to configure a vECU external to the composite SBOM analysis module 106, wherein the instruction sent may comprise binaries obtained from the attachment data storage 830.

FIG. 17 illustrates a flowchart of operations performed by a vehicle software bill of materials management and analysis service to generate a composite SBOM for a vehicle using one or more received SBOMs, according to some embodiments.

At block 1702, a definition for a composite software bill of materials (composite SBOM) is configured using a vehicle software bill of materials management service, based on a received indication of one or more required attributes to be represented in the composite SBOM, wherein the one or more required attributes comprise inclusion of a unique identifier for the composite SBOM. In some embodiments, the unique identifier may be a combination of "name", "version", and "platform", as further discussed in FIG. 1A.

At block 1704, respective granularities of specificity at which software artifacts are to be represented in the composite SBOM are determined based on identity attributes of software artifacts to be included in the composite SBOM, wherein the identity attributes are used to determine whether an additional unique software artifact instance is to be included in the composite SBOM. In some embodiments, based on a definition for software artifact instance specified by a customer, the vehicle software bill of materials management service may represent one or more subcomponents of a software artifact as separate software artifact instances, as further discussed in FIGS. 1A and 2.

At block 1706, a first software bill of materials (first SBOM) is received, wherein the first SBOM comprises a definition for a software artifact for a vehicle. In some embodiments, the first SBOM may be formatted according to one or more of Cyclone Dependency Exchange (CycloneDX) file format, a Software Package Data Exchange (SPDX) file format, a Comma-Separated Values (CSV) file format, an extensible Markup Language (XML) file format, or a JavaScript Object Notation (JSON) file format.

At block 1708, a second software bill of materials (second SBOM) is received, wherein the second SBOM comprises a different definition for the same software artifact for the vehicle. In some embodiments, the second SBOM may include additional metadata comprise one or more of: a documentation for vehicle software, a vehicle software test result, a vehicle software certification result, or binaries of the vehicle software.

At block 1710, a first attribute of the first SBOM and a second attribute of the second SBOM are mapped to one or more of the identity attributes of the software artifacts to be included in the composite SBOM. In some embodiments, a composite SBOM generator and updater of the vehicle software bill of materials management service may resolve conflicts arising from conflicts in SBOMs used to generate the composite SBOM, as further discussed in FIG. 6.

At block 1712 the composite SBOM is generated based on the mapped first attribute and the mapped second attribute, wherein the composite SBOM comprises one or more vehicle software artifact instances. In some embodiments, the composite SBOM may furthermore be processed using an ETL module to transform the composite SBOM to a data structure for performing analytical operations, as further discussed in FIG. 14.

FIG. 18 illustrates a flowchart of operations performed by a vehicle software bill of materials management and analysis service to generate a data structure for analytical operation using a composite SBOM, according to some embodiments.

At block 1802, a composite software bill of materials (composite SBOM) for a vehicle or a fleet of vehicles is received, using a vehicle software bill of materials management and analysis service, wherein the composite SBOM comprising vehicle software artifact instances are generated using at least a first SBOM and a second SBOM for the vehicle or the fleet of vehicles. In some embodiments, the composite SBOM may comprise software artifact instances with respective identity attributes, as further discussed in FIGS. 1A and 2.

At block 1804, the composite SBOM is formatted into a data structure for performance of an analytical operation, wherein the data structure comprises data structure components representing the vehicle software artifact instances of the composite SBOM at a determined granularity of specificity, and wherein the different data structure components are associated with at least one differing identity attribute. In some embodiments, the data structure may be a labeled property graph, as further discussed in FIGS. 1B and 14.

At block 1806, the analytical operation is performed using the formatted data structure. In some embodiments, the analytical operation may be one of an impact analysis operation, a license analysis operation, or a vulnerability analysis operation, as further discussed in FIGS. 15A and 15B.

Example Computer System

Figure 19:
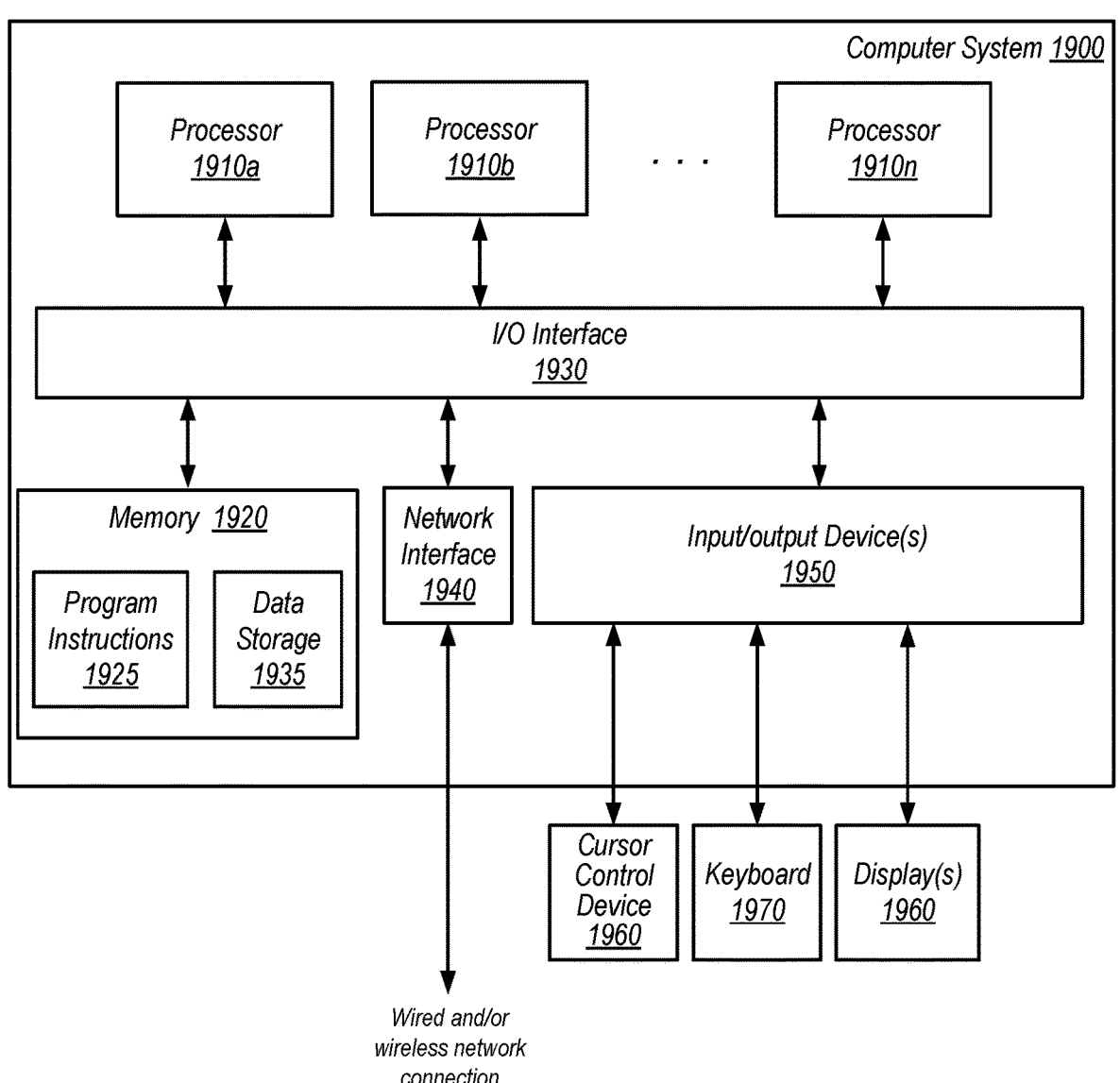
FIG. 19 illustrates a block diagram illustrating an example computer system that implements some, or all, of the techniques described herein, according to some embodiments.

Any of various computer systems may be configured to implement processes associated with a vehicle software bill of materials management and analysis service or any other component of the above figures. For example, FIG. 19 illustrates a block diagram illustrating an example computer system that implements some, or all, of the techniques described herein, according to some embodiments. In various embodiments, the vehicle software bill of materials management and analysis service, the provider network for the vehicle software bill of materials management and analysis service, the operating system in a vehicle or device, or any other component of the above figures FIGS. 1-18 may each include one or more computer systems 1900 such as that illustrated in FIG. 19.

In the illustrated embodiment, computer system 1900 includes one or more processors 1910 coupled to a system memory 1920 via an input/output (I/O) interface 1930. Computer system 1900 further includes a network interface 1940 coupled to I/O interface 1930. In some embodiments, computer system 1900 may be illustrative of servers implementing enterprise logic or that provide a downloadable application, while in other embodiments servers may include more, fewer, or different elements than computer system 1900.

In various embodiments, computing device 1900 may be a uniprocessor system including one processor or a multiprocessor system including several processors 1910a-1910n (e.g., two, four, eight, or another suitable number). Processors 1910a-1910n may include any suitable processors capable of executing instructions. For example, in various embodiments, processors 1910a-1910n may be processors implementing any of a variety of instruction set formats (ISAs), such as the x86, PowerPC, SPARC, or MIPS ISAs, or any other suitable ISA. In some embodiments, processors 1910a-1910n may include specialized processors such as graphics processing units (GPUs), application specific integrated circuits (ASICs), etc. In multiprocessor systems, each of processors 1910a-1910n may commonly, but not necessarily, implement the same ISA.

System memory 1920 may be configured to store program instructions and data accessible by processor(s) 1910a-1910n. In various embodiments, system memory 1920 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1920 as code (e.g., program instructions) 1925 and data storage 1935.

In one embodiment, I/O interface 1930 may be configured to coordinate I/O traffic between processors 1910a-1910n, system memory 1920, and any peripheral devices in the device, including network interface 1940 or other peripheral interfaces. In some embodiments, I/O interface 1930 may perform any necessary protocol, timing, or other data transformations to convert data signals from one component (e.g., system memory 1920) into a format suitable for use by another component (e.g., processor 1910). In some embodiments, I/O interface 1930 may include support for devices attached through various types of peripheral buses, such as a variant of the Peripheral Component Interconnect (PCI) bus standard or the Universal Serial Bus (USB) standard, for example. In some embodiments, I/O interface 1930 may include support for devices attached via an automotive may bus, etc. In some embodiments, the function of I/O interface 1930 may be split into two or more separate components, such as a north bridge and a south bridge, for example. Also, in some embodiments, some, or all of the functionality of I/O interface 1930, such as an interface to system memory 1920, may be incorporated directly into processors 1910a-1910n.

In some embodiments, the network interface 1940 may be coupled to I/O interface 1930, and one or more input/output devices 1950, such as cursor control device 1960, keyboard 1970, and display(s) 1980. In some cases, it is contemplated that embodiments may be implemented using a single instance of computer system 1900, while in other embodiments multiple such computer systems, or multiple nodes making up computer system 1900, may be configured to host different portions or instances program instructions as described above for various embodiments. For example, in one embodiment some elements of the program instructions may be implemented via one or more nodes of computer system 1900 that are distinct from those nodes implementing other elements.

Network interface 1940 may be configured to allow data to be exchanged between computing device 1900 and other devices associated with a network or networks. In various embodiments, network interface 1940 may support communication via any suitable wired or wireless general data networks, such as types of ethernet networks, cellular networks, Bluetooth networks, Wi-Fi networks, Ultra-wideband Networks, for example. Additionally, network interface 1940 may support communication via telecommunications/telephony networks such as analog voice networks or digital fiber communications networks, via storage area networks such as Fibre Channel SANs, or via any other suitable type of network and/or protocol.

In some embodiments, system memory 1920 may be one embodiment of a computer-readable (e.g., computer-accessible) medium configured to store program instructions and data as described above for implementing embodiments of the corresponding methods, systems, and apparatus. However, in other embodiments, program instructions and/or data may be received, sent, or stored upon different types of computer-readable media. Generally speaking, a computer-readable medium may include non-transitory storage media or memory media such as magnetic or optical media, e.g., disk or DVD/CD coupled to computing device 1900 via I/O interface 1930. One or more non-transitory computer-readable storage media may also include any volatile or nonvolatile media such as RAM (e.g., SDRAM, DDR SDRAM, RDRAM, SRAM, etc.), ROM, etc., that may be included in some embodiments, of computing device 1900 as system memory 1920 or another type of memory. Further, a computer-readable medium may include transmission media or signals such as electrical, electromagnetic, or digital signals, conveyed via a communication medium such as a network and/or a wireless link, such as may be implemented via network interface 1940. Portions or all of multiple computing devices such as that illustrated in FIG. 19 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device" and "ECU" as used herein, refers to at least all these types of devices, and is not limited to these types of devices.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:

one or more processors; and a memory, storing program instructions that when executed on or across the one or more processors, cause the one or more processors to implement a vehicle software bill of materials management and analysis service, configured to:

receive a composite software bill of materials (composite SBOM) for a vehicle or a fleet of vehicles, the composite SBOM comprising vehicle software artifact instances generated using at least a first software bill of materials (first SBOM) and a second software bill of materials (second SBOM) for the vehicle or the fleet of vehicles;

format the composite SBOM into a data structure for performance of an analytical operation, wherein:

the data structure is a property graph comprising nodes representing the vehicle software artifacts instances of the composite SBOM, wherein the property graph represents the vehicle software artifact instances at a determined granularity of specificity of a plurality of granularities of specificity included in the composite SBOM; and different nodes of the property graph are labeled with at least one differing identity attribute at the determined granularity of specificity; and perform the analytical operation using the formatted data structure.

2. The system of claim 1, wherein the vehicle software bill of materials management and analysis service is further configured to:

receive an update for the composite SBOM, wherein the update comprises one or more changes to one or more of the vehicle software artifact instances, an addition of another vehicle software artifact instance, or removal of one of the vehicle software artifact instances; and based on the update, determine one or more updates to the property graph, wherein the one or more updates comprise one or more of:

addition of another node representing the other software artifact instance;

removal of a node in the property graph; and change to one or more properties of a node of the property graph.

3. The system of claim 1, wherein:

the composite SBOM comprise traceability records for one or more of the vehicle software artifacts instances, wherein the traceability records indicate changes to the vehicle software artifact instances; and to perform the analytical operation using the formatted data structure the vehicle software bill of materials management and analysis service is further configured to:

determine, using the traceability records for the vehicle software artifact instances, whether a vehicle that the vehicle software artifact instances are deployed to meets one or more vehicle safety standards.

4. The system of claim 3, wherein the traceability records comprise one or more of:

a reference to attachment, or removal of, binary data associated with the one or more vehicle software artifacts instances; or a reference to changes from a previous version of the respective one or more vehicle software artifacts instance to a subsequent version of the respective one or more vehicle software artifacts instances.

5. A method, comprising:

receiving, using a vehicle software bill of materials management and analysis service, a composite software bill of materials (composite SBOM) for a vehicle or a fleet of vehicles, the composite SBOM comprising vehicle software artifact instances generated using at least a first SBOM and a second SBOM for the vehicle or the fleet of vehicles;

formatting the composite SBOM into a data structure for performance of an analytical operation, wherein:

the data structure comprises data structure components representing the vehicle software artifacts instances of the composite SBOM at determined granularities of specificity; and different data structure components of the data structure are associated with at least one differing identity attribute; and performing the analytical operation using the formatted data structure.

6. The method of claim 5, wherein the data structure is a property graph comprising nodes representing the vehicle software artifact instances of the composite SBOM at the determined granularities of specificity, and wherein different nodes of the property graph are labeled with the at least one differing identity attribute.

7. The method of claim 5, further comprising:

receiving an indication of a scope of the formatted data structure to be used to perform validation of licenses; and wherein the analytical operation is an operation to analyze validity of one or more licenses associated with the software artifact instances included in the indicated scope using the formatted data structure.

8. The method of claim 5, further comprising:

receiving an indication of a scope of the formatted data structure to be used to perform feasibility of deployment of vehicle software analysis; and wherein the analytical operation is an operation to analyze impact of deployment of the vehicle using the formatted data structure for the indicated scope.

9. The method of claim 5, further comprising:

receiving an indication of a scope of the formatted data structure to be used to perform a vulnerability analysis; and wherein the analytical operation is an operation to analyze security vulnerability of software associated with the software artifact instances using the formatted data structure for the indicated scope.

10. The method of claim 5, further comprising:

receiving an indication of a scope of the formatted data structure to use for configuring a virtual electronic control unit (vECU); and sending instructions to configure the vECU based on the scope of the formatted data structure.

11. The method of claim 10, further comprising:

obtaining binaries associated with one or more vehicle software artifact instances of the composite SBOM required to configure the vECU; and wherein the instructions sent comprise the binaries.

12. The method of claim 5, further comprising:

receiving an update for the composite SBOM, wherein the update comprises one or more changes to one or more of the vehicle software artifact instances, an addition of another vehicle software artifact instance, or removal of one of the vehicle software artifact instances; and based on the update, determining one or more updates to the formatted data structure, wherein the one or more updates comprises one or more of:

addition of another node representing the other software artifact instance;

removal of a data structure component in the property graph; and change to one or more properties of a data structure component of the property graph.

13. The method of claim 5, wherein:

the composite SBOM comprise traceability records for one or more of the vehicle software artifacts instances;

the traceability records indicate changes to the vehicle software artifact instances; and performing the analytical operation using the formatted data structure comprises:

determining, using the traceability records for the vehicle software artifact instances, whether a vehicle that the vehicle software artifact instances are deployed to meets one or more vehicle safety standards.

14. The method of claim 13, wherein the traceability records comprise one or more of:

a reference to attachment, or removal of, binary data associated with the one or more vehicle software artifacts instances; or a reference to changes from a previous version of the respective one or more vehicle software artifacts instances to a subsequent version of the respective one or more vehicle software artifacts instances.

15. One or more non-transitory, computer-readable storage media, storing program instructions that when executed on or across one or more computing devices cause the one or more computing devices to implement:

receiving, using a vehicle software bill of materials management and analysis service, a composite software bill of materials (composite SBOM) for a vehicle or a fleet of vehicles, the composite SBOM comprising vehicle software artifact instances generated using at least a first SBOM and a second SBOM for the vehicle or the fleet of vehicles;

formatting the composite SBOM into a data structure for performance of an analytical operation, wherein:

the data structure comprises data structure components representing the vehicle software artifacts instances of the composite SBOM at determined granularities of specificity; and different data structure components of the data structure are associated with at least one differing identity attribute; and performing the analytical operation using the formatted data structure.

16. The one or more non-transitory, computer-readable, storage media of claim 15, wherein the data structure is a property graph comprising nodes representing the vehicle software artifact instances of the composite SBOM at the determined granularities of specificity, and wherein different nodes of the property graph are labeled with the at least one differing identity attribute.

17. The one or more non-transitory, computer-readable, storage media of claim 15, wherein the instructions, when executed on or across one or more computing devices, cause the one or more computing devices to implement:

receiving an indication of a scope of the formatted data structure to be used to perform validation of licenses analysis; and wherein the analytical operation is an operation to analyze validity of one or more licenses associated with the software artifact instances included in the indicated scope using the formatted data structure.

18. The one or more non-transitory, computer-readable, storage media of claim 15, wherein the instructions, when executed on or across one or more computing devices, cause the one or more computing devices to implement:

receiving an indication of a scope of the formatted data structure to be used to perform feasibility of deployment of vehicle software; and wherein the analytical operation is an operation to analyze impact of deployment of the vehicle using the formatted data structure at the indicated scope.

19. The one or more non-transitory, computer-readable, storage media of claim 15, wherein the instructions, when executed on or across one or more computing devices, cause the one or more computing devices to implement:

receiving an indication of a scope of the formatted data structure to be used to perform a vulnerability analysis; and wherein the analytical operation is an operation to analyze security vulnerability of software associated with the software artifact instances using the formatted data structure at the indicated scope.

20. The one or more non-transitory, computer-readable, storage media of claim 15, wherein the instructions, when executed on or across one or more computing devices, cause the one or more computing devices to implement:

receiving an indication of a scope of the formatted data structure to use for configuring a virtual electronic control unit (vECU); and sending instructions to configure the vECU based on the scope of the formatted data structure.

\* \* \* \* \*